US012808653B2

(12) United States Patent
Hamner et al.

(10) Patent No.: US 12,808,653 B2
(45) Date of Patent: Nov. 24, 2026

(54) METROLOGY SYSTEM WITH OPTICAL FILTER PORTION AND SPECTROMETER PORTION

(71) Applicant: Mitutoyo Corporation, Kanagawa-ken (JP)

(72) Inventors: Christopher Richard Hamner, Kirkland, WA (US); Zachary William Fox, Kenmore, WA (US); Nick Hartmann, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 72 days.

(21) Appl. No.: 19/005,528

(22) Filed: Dec. 30, 2024

(65) Prior Publication Data

US 2026/0185815 A1 Jul. 2, 2026

(51) Int. Cl.
*G01B 9/02* (2022.01)
*G01B 9/02091* (2022.01)

(52) U.S. Cl.
CPC ..... *G01B 9/02044* (2013.01); *G01B 9/02091* (2013.01)

(58) Field of Classification Search
CPC ........................ G01B 9/02044; G01B 9/02091
USPC .......................................................... 356/454
See application file for complete search history.

(56) References Cited

U.S. PATENT DOCUMENTS 5,734,493 A 3/1998 Jopson
6,262,822 B1 7/2001 Obhi et al.
7,342,659 B2 3/2008 Horn et al.
7,671,971 B2 3/2010 Aebischer et al.
8,199,330 B2 6/2012 Hara
8,693,004 B2 4/2014 Chandler et al.
9,506,740 B2 11/2016 Brezinski et al.
10,330,778 B2 6/2019 Kaneda
10,444,143 B2 10/2019 Mäntylä et al.
11,255,969 B2 2/2022 Komatsuzaki
11,415,406 B2 8/2022 Komatsuzaki et al.
11,422,244 B2 8/2022 Thorpe et al.
11,635,518 B2 4/2023 Ujihara et al.
(Continued)

FOREIGN PATENT DOCUMENTS

CN 117134789 A 11/2023
JP 3583906 B2 11/2004
(Continued)

*Primary Examiner* — Md M Rahman
(74) *Attorney, Agent, or Firm* — Seed Intellectual Property Law Group LLP

(57) ABSTRACT

A metrology system includes a light portion configured to output light; a branching portion configured to branch the light as reference light along a reference optical path and as measurement light along a measurement optical path to be reflected by a workpiece that is to be measured; a detector and processing portion comprising a spectrometer portion; and an optical filter portion. The detector and processing portion is configured to: receive combined light comprising reference light from the reference optical path and measurement light from the measurement optical path that is reflected by the workpiece; and convert the combined light into a distance indicating electrical signal. The optical filter portion is located along an optical path between the branching portion and the spectrometer portion, and comprises one or more optical filters, wherein each optical filter is configured to filter incoming light and produce light comprising a series of spectral peaks.

20 Claims, 13 Drawing Sheets

(56) References Cited

U.S. PATENT DOCUMENTS

| | | | |
|---|---|---|---|
| 11,874,404 | B2 | 1/2024 | Tzuang et al. |
| 11,879,975 | B2 | 1/2024 | Komatsuzaki et al. |
| 11,885,879 | B2 | 1/2024 | Suzuki et al. |
| 2002/0071109 | A1 | 6/2002 | Allen et al. |
| 2002/0130256 | A1 | 9/2002 | Macki et al. |
| 2005/0083513 | A1 | 4/2005 | Rogers |
| 2006/0055936 | A1 | 3/2006 | Yun et al. |
| 2007/0278389 | A1 | 12/2007 | Ajgaonkar et al. |
| 2008/0018881 | A1 | 1/2008 | Hui et al. |
| 2008/0038001 | A1 | 2/2008 | Becker et al. |
| 2013/0044311 | A1 | 2/2013 | Rakuljic |
| 2017/0290514 | A1 | 10/2017 | Liu et al. |
| 2017/0343652 | A1 | 11/2017 | de Mersseman et al. |
| 2018/0188019 | A1 | 7/2018 | Eggleston |
| 2018/0224548 | A1 | 8/2018 | Hariyama et al. |
| 2020/0064477 | A1 | 2/2020 | Komatsuzaki |
| 2020/0256671 | A1 | 8/2020 | Przygodda et al. |
| 2022/0268931 | A1 | 8/2022 | Ujihara |

FOREIGN PATENT DOCUMENTS

| | | | |
|---|---|---|---|
| JP | 2008172717 | A | 7/2008 |
| JP | 2013221912 | A | 10/2013 |
| JP | 2024059119 | A | 5/2024 |
| WO | 2023210116 | A1 | 11/2023 |

METROLOGY SYSTEM WITH OPTICAL FILTER PORTION AND SPECTROMETER PORTION

BACKGROUND

Technical Field

This disclosure relates to precision metrology, and more particularly to precision workpiece surface measurement devices and systems.

Description of the Related Art

Quality control of objects (e.g., workpieces) that include specific surface profiles (e.g., produced by molding and/or machining, or the like), is becoming increasingly demanding in terms of throughput, measurement resolution, and accuracy. Ideally, such workpieces should be measured/inspected to ensure proper dimensions, function, etc. However, very precise measurement tolerances (e.g., in some instances micron level or finer) may be required in order to confirm a workpiece surface with desired characteristics for some applications.

Various precision metrology systems may be used for workpiece surface measurements and inspection. For example, in some instances a metrology system that performs such operations may utilize optical coherence tomography (OCT) techniques, such as spectral domain optical coherence tomography (SD-OCT) technology, which can determine a distance to a target (e.g., to a point on a workpiece surface, for which distances to multiple points on a workpiece surface may be determined as part of measurement operations for the workpiece surface). An important part of such systems and/or other comparable measurement systems is the effective coherence length and/or measurement range. Configurations that may improve or otherwise enhance such metrology systems (e.g., for measuring and inspecting surfaces of workpieces, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system is provided, which comprises: a light portion configured to output light; a branching portion; and a detector and processing portion. The branching portion is configured to: branch a part of the light output from the light portion as reference light that is directed along a reference optical path; and branch at least a part of the remaining light as measurement light that is directed along a measurement optical path to be reflected by a workpiece that is to be measured. The detector and processing portion includes a detector portion comprising a spectrometer portion; and a processing portion which processes signals from the detector portion. The detector and processing portion is configured to: receive combined light comprising reference light from the reference optical path and measurement light from the measurement optical path that is reflected by the workpiece; and convert the combined light into a distance indicating electrical signal.

In various implementations, the light that is output from the light portion and that is received at the branching portion comprises a series of spectral peaks. In various implementations, the light portion comprises at least one of: an optical filter (e.g., an etalon filter) that is configured to filter light from a light source to provide the light with the series of spectral peaks; or a light source that is configured to provide the light with the series of spectral peaks.

In various alternative implementations, the metrology system comprises an optical filter portion located along an optical path between the branching portion and the spectrometer portion. The optical filter portion comprises one or more optical filters (e.g., one or more etalon filters), wherein each optical filter is configured to filter incoming light and produce light comprising a series of spectral peaks. The spectrometer portion of the detector portion is configured to receive light comprising a series of spectral peaks as provided by the optical filter portion.

According to another aspect, a method for operating a metrology system is provided. In various implementations, the metrology system may be configured to perform the method. The method includes:

- controlling the light portion to output light;
- receiving at the spectrometer portion combined light comprising reference light from the reference optical path and measurement light from the measurement optical path that is reflected by the workpiece; and
- converting the combined light into a distance indicating electrical signal.

In various implementations, the light that is output from the light portion and that is received at the branching portion comprises a series of spectral peaks (e.g., in accordance with the light portion comprising at least one of: an optical filter that is configured to filter light from a light source to provide the light with the series of spectral peaks; or a light source that is configured to provide the light with the series of spectral peaks).

In various alternative implementations, the combined light that is received at the spectrometer portion comprises a series of spectral peaks as having been filtered by an optical filter portion, wherein the optical filter portion is located along an optical path between the branching portion and the spectrometer portion. The optical filter portion comprises one or more optical filters, wherein each optical filter is configured to filter incoming light and produce light comprising a series of spectral peaks.

DETAILED DESCRIPTION

Figure 1:
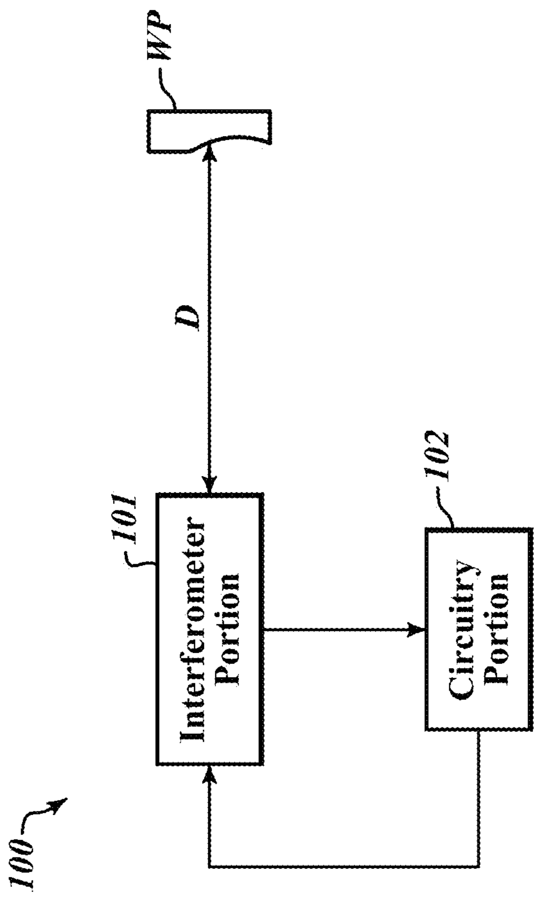
FIG. 1 is a block diagram of a metrology system including an interferometer portion and a circuitry portion.

FIG. 1 is a block diagram showing a metrology system 100 together with a workpiece WP to be measured. As shown in FIG. 1, the metrology system 100 includes an interferometer portion 101 and a circuitry portion 102. The metrology system utilizes spectral domain optical coherence tomography (SD-OCT) techniques, as will be described in more detail below. Certain implementations of the interferometer portion 101 will be described in more detail below with respect to FIGS. 2 and 3. An implementation of the circuitry portion 102 will be described in more detail below with respect to FIG. 4.

In various implementations, the metrology system 100 is configured to determine a distance D to a workpiece. More specifically, the metrology system 100 optically measures a distance between the metrology system 100 and the workpiece WP. The metrology system 100 may also measure a three-dimensional shape and/or surface characteristics of the workpiece WP (e.g., by scanning the position of light irradiated on the workpiece WP, such as for measuring different points on a surface of the workpiece WP).

Figure 2:
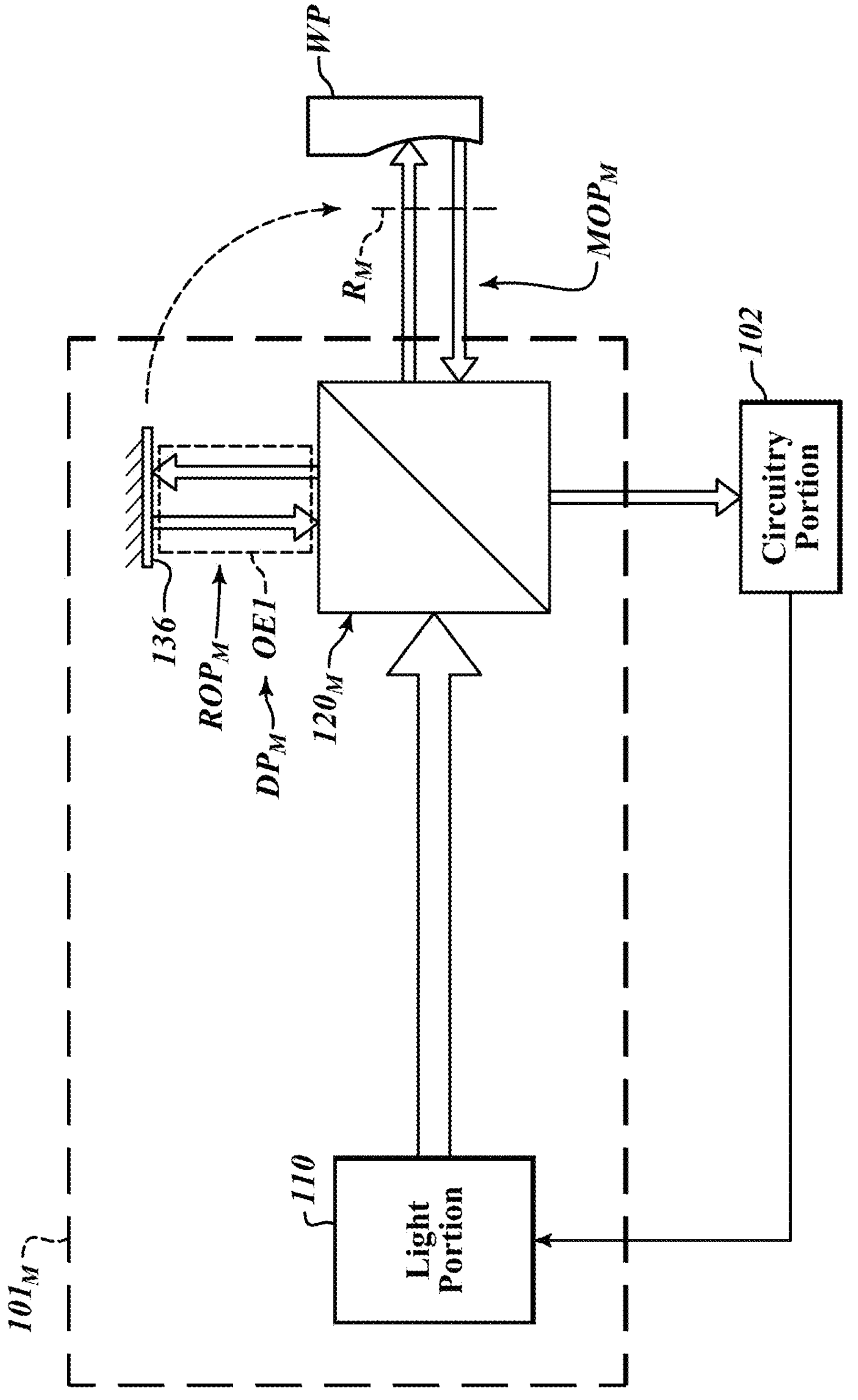
FIG. 2 is a block diagram illustrating a first implementation of an interferometer portion as may be included in a metrology system such as that of FIG. 1.

FIG. 2 is a block diagram illustrating a first implementation of an interferometer portion $\mathbf{101}_M$ as may be included in a metrology system 100 such as that of FIG. 1. As shown in FIG. 2, the interferometer portion $\mathbf{101}_M$ includes a light portion 110, a branching portion $\mathbf{120}_M$ and a reference mirror 136. As will be described in more detail below, the interferometer portion $\mathbf{101}_M$ directs light toward a workpiece WP (e.g., for measuring a distance to the workpiece WP).

In various implementations, the light portion 110 may comprise a broadband incoherent light source (e.g., as is known for utilization with SD-OCT techniques). The branching portion $\mathbf{120}_M$ splits a portion of the light output by the light portion 110 as reference light and at least a portion of the remaining light as measurement light. As will be described in more detail below, the reference light is directed along a reference optical path $ROP_M$ and the measurement light is directed along a measurement optical path $MOP_M$. In various implementations, the branching portion $\mathbf{120}_M$ may comprise a splitter component (e.g., a beamsplitter, etc.) In various implementations, the splitter component may have a designated split ratio (e.g., 1:1, such that an approximately equal amount of light may be directed along each of the reference optical path $ROP_M$ and the measurement optical path $MOP_M$).

In the reference optical path $ROP_M$, reference light branched from the branching portion $\mathbf{120}_M$ is irradiated toward the reference mirror 136, which reflects the reference light back toward the branching portion $\mathbf{120}_M$. In the measurement optical path $MOP_M$, measurement light branched from the branching portion $\mathbf{120}_M$ is irradiated toward the workpiece WP. Measurement light reflected from the workpiece WP is received back at the branching portion $\mathbf{120}_M$. In various implementations, a distance between at least part of the branching portion $\mathbf{120}_M$ and the workpiece WP may be set as a distance D to be measured by the metrology system 100.

The branching portion $\mathbf{120}_M$ combines the reflected measurement light with the reference light reflected by the reference mirror 136. In this way, FIG. 2 shows an example in which the branching portion $\mathbf{120}_M$ also functions as a combining portion (e.g., for which in some implementations the branching portion may also or alternatively be referenced as a branching and combining portion $\mathbf{120}_M$ or simply a combining portion $\mathbf{120}_M$). The branching portion $\mathbf{120}_M$ outputs the combined light (e.g., including the reference light and the measurement light) to the circuitry portion 102 (e.g., to a detector portion 140 in the circuitry portion 102, as will be described in more detail below with respect to FIG. 4).

In various implementations, the reference optical path $ROP_M$ may have a reference optical path length (e.g., as including the travel of the reference light to and from the reference mirror 136). Similarly, the measurement optical path $MOP_M$ may have a measurement optical path length (e.g., as including the travel of the measurement light to and from the workpiece WP). In general, there may be a difference between the reference optical path length and the measurement optical path length. In the example of FIG. 2, a reference marker RM is provided which indicates a representation of the length of the reference optical path $ROP_M$, as shown in relation to the measurement optical path $MOP_M$. In this example, the measurement optical path $MOP_M$ is indicated to have a greater length than the reference optical path $ROP_M$. In an alternative condition in which the reference optical path $ROP_M$ had a greater length than the measurement optical path $MOP_M$, the measured surface of the workpiece WP would be shown before the reference marker RM (i.e., to the left of the reference marker RM in FIG. 2). As will be described in more detail below, the circuitry portion 102 may be configured to receive the combined light (i.e., comprising the combined reference light and measurement light), and to produce an output (e.g., which indicates a distance to the workpiece, and which correspondingly indicates a difference between the reference optical path length and the measurement optical path length).

In various implementations, the interferometer portion $\mathbf{101}_M$ of the metrology system may include a dispersion portion $DP_M$. In the example of FIG. 2, the dispersion portion $DP_M$ is included in the reference optical path $ROP_M$, although in certain alternative implementations the dispersion portion may be included in the measurement optical path $MOP_F$. In the illustrated example, the dispersion portion $DP_M$ comprises a high dispersion optical element OE1. In various implementations, the optical element OE1 may be at least semi-transparent for which light (e.g., reference light in the illustrated example) may pass through the optical element OE1, with the optical element OE1 causing dispersion of the light. In various implementations, an imbalanced dispersion between the reference optical path and the measurement optical path results at least in part from the dispersion portion (e.g., as may be utilized as part of a process for determining a measurement distance to the workpiece WP).

Figure 3:
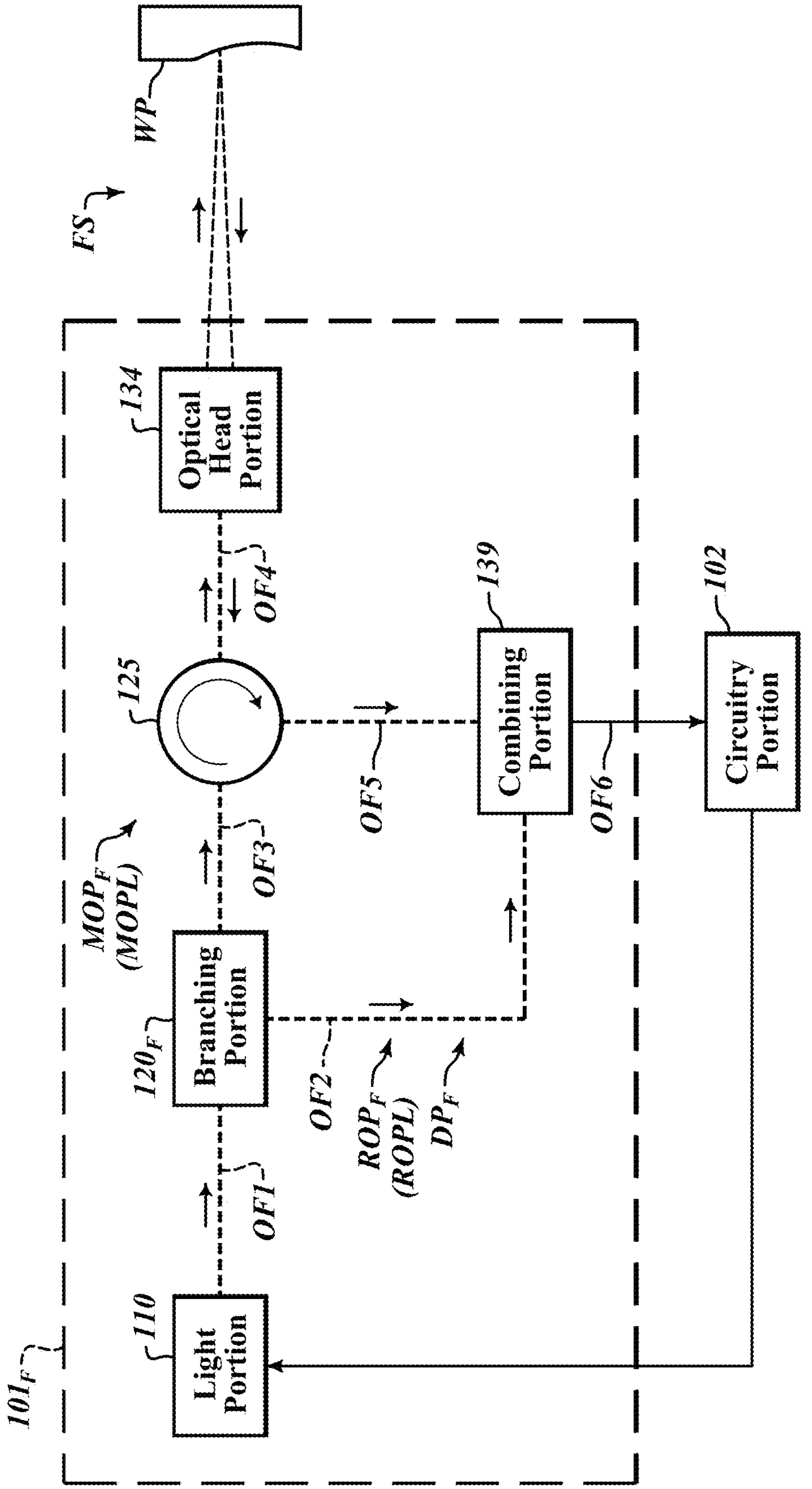
FIG. 3 is a block diagram illustrating a second implementation of an interferometer portion as may be included in a metrology system such as that of FIG. 1.

FIG. 3 is a block diagram illustrating a second implementation of an interferometer portion $\mathbf{101}_F$ as may be included in a metrology system 100 such as that of FIG. 1. As shown in FIG. 3, the interferometer portion $\mathbf{101}_F$ includes a light portion 110, a branching portion $\mathbf{120}_F$, a circulator portion 125, an optical head portion 134 and a combining portion 139. Optical fibers OF1-OF6 are shown to connect the different portions for providing light to and/or from the different portions. More specifically, the light portion 110 is coupled to the branching portion $\mathbf{120}_F$ by an optical fiber OF1. The branching portion $\mathbf{120}_F$ is coupled to the combining portion 139 by an optical fiber OF2, and is coupled to the circulator portion 125 by an optical fiber OF3. The circulator portion 125 is coupled to the optical head portion 134 by an optical fiber OF4, and is coupled to the combining portion 139 by an optical fiber OF5. The combining portion 139 is coupled to the circuitry portion 102 by an optical fiber OF6.

As will be described in more detail below, the interferometer portion $\mathbf{101}_F$ directs light toward a workpiece WP (e.g., for measuring a distance to the workpiece WP). In various implementations, the metrology system may optically measure a distance between the interferometer portion $\mathbf{101}_F$ and the workpiece WP (e.g., and in various implementations may also measure a three-dimensional shape and/or surface characteristics of the workpiece WP, such as by scanning the position of light irradiated on the workpiece WP, such as for measuring different points on a surface of the workpiece WP).

The branching portion $\mathbf{120}_F$ branches the light output from the light portion 110, with part of the light as reference light and at least some of the remaining light as measurement light. The branching portion $\mathbf{120}_F$ is, for example, a fiber optic splitter (e.g., as may also or alternatively be referenced as a fiber optic coupler). In the example of FIG. 3, the branching portion $\mathbf{120}_F$ supplies the measurement light to the circulator portion 125, and supplies the reference light to the combining portion 139.

The circulator portion 125 has a plurality of input/output ports. For example, the circulator portion 125 inputs a light from one port and outputs the light from the next port, and inputs a light from the next port and outputs the light from the port after next. FIG. 3 shows an example in which the circulator portion 125 has three input/output ports. In this case, the circulator portion 125 outputs the measurement light supplied from the branching portion $\mathbf{120}_F$ to the optical head portion 134. Also, the circulator portion 125 outputs a light input from the optical head portion 134 (i.e., as reflected from the workpiece WP) to the combining portion 139.

The optical head portion 134 provides/radiates/directs the light input from the circulator portion 125 toward the workpiece WP. The optical head portion 134 includes, for example, a collimator lens. In this case, the optical head portion 134 first adjusts the light input from the circulator portion 125 via the optical fiber OF4 into a beam shape using the collimator lens, and then outputs the light.

Also, the optical head portion 134 receives a reflected light of the measurement light radiated onto the workpiece WP. The optical head portion 134 focuses the received reflected light onto the optical fiber OF4 with a collimator lens and supplies it to the circulator portion 125. In this case, the optical head portion 134 may include one common collimator lens, and the collimator lens may irradiate the workpiece WP with the measurement light, and may receive the reflected light from the workpiece WP. In various implementations, a distance between at least part of the optical head portion 134 and the workpiece WP may be defined as a distance D (e.g., which may in some implementations be characterized as a measurement distance D).

Alternatively, the optical head portion 134 may include a focusing lens. In this case, the optical head portion 134 focuses the light input from the circulator portion 125 via the optical fiber OF4 on the surface of the workpiece WP. The optical head portion 134 receives at least a part of the reflected light reflected from the surface of the workpiece WP. The optical head portion 134 focuses the received reflected light onto the optical fiber OF4 using the focusing lens and supplies the light to the circulator portion 125. Also in this case, the optical head portion 134 may include one common focusing lens, and that focusing lens may irradiate the workpiece WP with the measurement light and receive the reflected light from the workpiece WP.

The combining portion 139 receives, from the circulator portion 125, the reflected light that is the measurement light radiated onto and reflected from the workpiece WP. Also, the combining portion 139 receives the reference light from the branching portion $\mathbf{120}_F$. The combining portion 139 combines/mixes the reflected measurement light and the reference light, and provides a corresponding output to the circuitry portion 102 (e.g., to a detector portion 140 in the circuitry portion 102, as will be described in more detail below with respect to FIG. 4). In various implementations, the combining portion 139 may be a fiber optic splitter (e.g., as may also be referenced as a fiber optic coupler and/or a fiber optic combiner).

For the reference light that travels along the reference optical path $ROP_F$(and as corresponding to a reference optical path length ROPL), the reference light travels from the branching portion $\mathbf{120}_F$, through the optical fiber OF2 to the combining portion 139. For the measurement light that travels along the measurement optical path $MOP_F$ (and as corresponding to a measurement optical path length MOPL), the measurement light travels from the branching portion $\mathbf{120}_F$, through the optical fiber OF3, through the circulator portion 125, through the optical fiber OF4, through the optical head portion 134, through free space FS to the workpiece WP (e.g., according to a distance D from the optical head portion 134 to the workpiece WP), and is reflected by the workpiece WP to travel back through the free space FS to the optical head portion 134 (e.g., according to the distance D from the optical head portion 134 to the workpiece WP), through the optical head portion 134, through the optical fiber OF4, through the circulator portion 125, and through the optical fiber OF5 to the combining portion 139.

Figure 4:
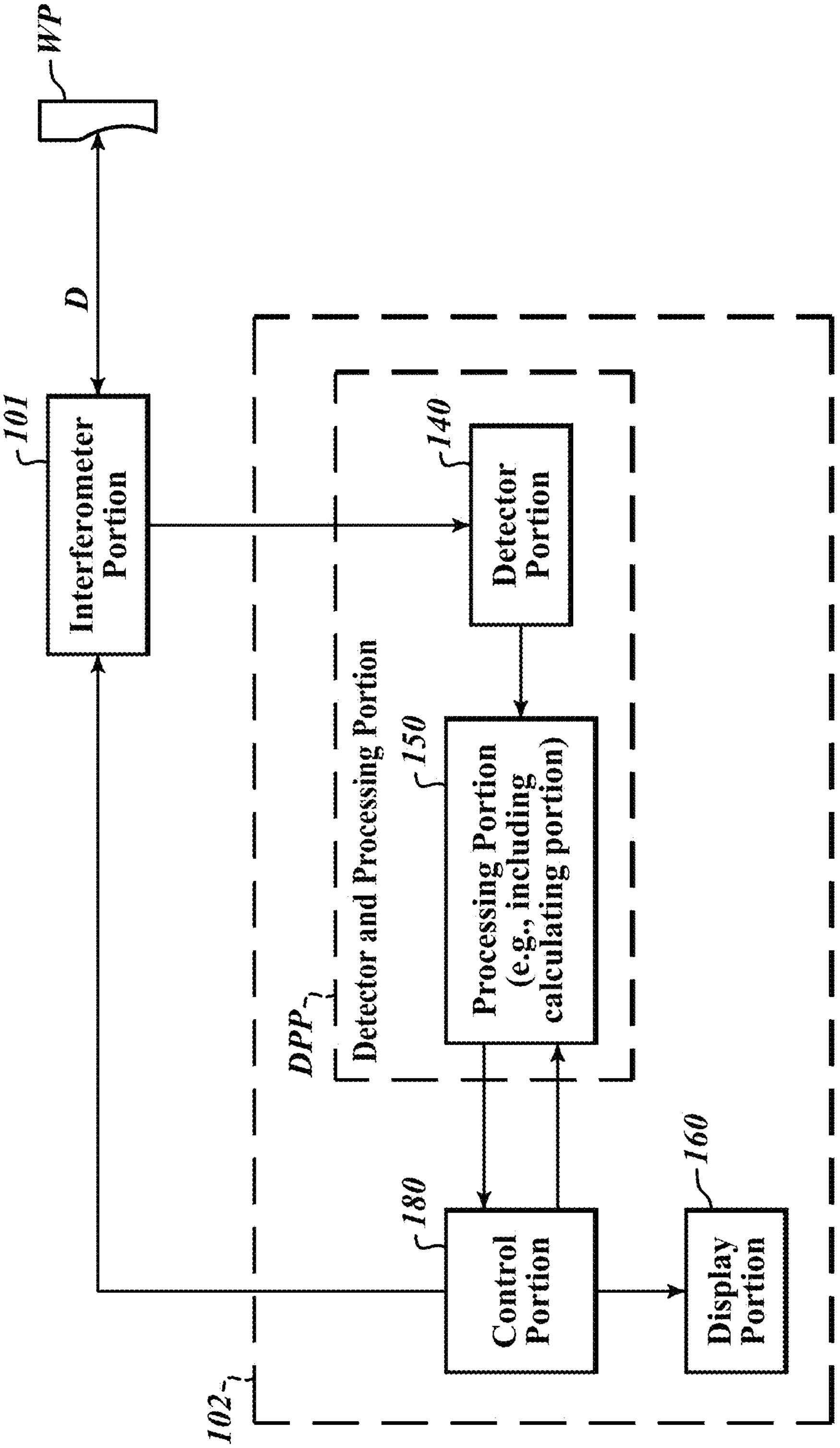
FIG. 4 is a block diagram illustrating an implementation of a circuitry portion as may be included in a metrology system such as that of FIG. 1.

In various implementations, as shown in FIG. 4, the detector and processing portion DPP (e.g., as including a spectrometer portion) may receive combined light (e.g., from a combining portion) and may convert the light into a distance indicating signal (e.g., which is utilized to determine the distance D to the workpiece, in accordance with SD-OCT techniques). In various implementations, a display portion 160 of the circuitry portion 102 is controlled by a control portion 180 to display the analysis result of the detector and processing portion DPP (e.g., as may display or otherwise indicate a distance to a workpiece, etc.). In various implementations, the display portion 160 may include a display or the like and display the detection result, and the control portion 180 may store the analysis result in a storage unit or the like. In general, the metrology system may measure a distance between the interferometer portion 101 and the workpiece WP (e.g., in accordance with processing a distance indicating signal that results from the combined light, etc.).

In various implementations, the interferometer portion $\mathbf{101}_F$ of the metrology system may include a dispersion portion $DP_F$. In the example of FIG. 3, the dispersion portion $DP_F$ is included in the reference optical path $ROP_F$, although in certain alternative implementations the dispersion portion may be included in the measurement optical path $MOP_F$. In the illustrated example, the dispersion portion $DP_F$ comprises a high dispersion optical fiber OF2 (i.e., for which the optical fiber OF2 which couples the branching portion 120$_F$ to the combining portion 139 as described above is a high dispersion optical fiber). In various implementations, the other optical path (e.g., the measurement optical path $MOP_F$) may include one or more lower dispersion optical fibers (e.g., lower in relation to the high dispersion optical fiber OF2 of the dispersion portion $DP_F$). For example, some or all of the optical fibers OF3, OF4 or OF5 may be relatively lower dispersion optical fibers. This may be contrasted with certain conventional configurations, in which optical fibers may be included in both optical paths with similar/matched (e.g., identical) dispersion characteristics. In various implementations, an imbalanced dispersion between the reference optical path and the measurement optical path results at least in part from the dispersion portion (e.g., as may be utilized as part of the process for determining a measurement distance to the workpiece WP).

Stated another way, in certain prior conventional configurations, matched optical fibers (e.g., with similar dispersion characteristics) in the reference and measurement optical paths have typically minimized cumulative unbalanced dispersion. Utilization of optical fibers with different dispersion characteristics in the two optical paths will result in an unbalanced dispersion (e.g., which in some instances may correspond to an increase in unbalanced dispersion). In such configurations, it is still desirable to match a baseline optical path length (OPL) for achieving the desired interference effects (e.g., as resulting from the combination of the reference and measurement light in the combining portion 139), but higher order phase can be added via dispersion.

In various implementations, an air gap (e.g., through free space FS, such as between the optical head portion 134 and the workpiece WP) may be utilized to deliver the measurement light to the workpiece WP. In some such configurations, it may be considered relatively more efficient to include relatively lower dispersion optical fiber(s) in the measurement optical path MOP (e.g., to enhance the dispersion mismatch created by the free space FS/air gap, such as relative to the reference optical path that may include a higher dispersion optical fiber). That being said, it will be appreciated that other configurations may also be utilized, with a primary goal in some such implementations being for the dispersion/optical fibers in the two optical paths to not be the same (e.g., having different dispersion characteristics), for which in general a greater dispersion mismatch may result in better disambiguation between signal peaks.

FIG. 4 is a block diagram illustrating an implementation of the circuitry portion 102 as may be included in a metrology system such as that of FIG. 1. As shown in FIG. 4, the circuitry portion 102 includes a detector and processing portion DPP (e.g., including a detector portion 140 and a processing portion 150), a display portion 160, and a control portion 180. In various implementations, the detector portion 140 of the detector and procession portion DPP receives/detects the combined reference and measurement light (e.g., as received from the branching portion 120$_M$ of FIG. 2 or the combining portion 139 of FIG. 3) and converts the combined light into an electrical signal. In various implementations, the detector portion 140 detects a signal that is generated by combining and interfering the reference light and the measurement light. In various implementations, the detector portion 140 may include a spectrometer portion, as will be described in more detail below.

The processing portion 150 (e.g., including a calculation portion) analyzes the detected electrical signal to calculate the distance D to the workpiece WP. The processing portion 150 analyzes the signal, for example, by using frequency conversion such as FFT. Then, the processing portion 150 calculates a distance based at least in part on the signal (e.g., for which in various implementations a peak resulting from the FFT may be associated with a distance, etc., in accordance with SD-OCT techniques).

In various implementations, the control portion 180 receives the output from the processing portion 150 of the detector and processing portion DPP, and controls the display portion 160 to display the analysis results of the processing portion 150. The display portion 160 may have a display or the like and display the detection results. The display portion 160 may also receive instructions from a user. In various implementations, the control portion 180 may be configured to control certain operations of the light portion 110, the display portion 160, and/or the detector and processing portion DPP. In various implementations, the control portion 180 may control the light portion 110 to output the light to the branching portion 120 (e.g., of FIG. 2 or FIG. 3). In general, it is noted that the metrology system 100 including the interferometer portion 101 and the circuitry portion 102 is capable of measuring a distance between the metrology system 100 and the workpiece WP.

As noted above, in various implementations, the interferometer portion 101 (e.g., the interferometer portion 101$_M$ of FIG. 2 or 101$_F$ of FIG. 3) of the metrology system may include a dispersion portion DP (e.g., the dispersion portion $DP_M$ of FIG. 2 or $DP_F$ of FIG. 3). An imbalanced dispersion between a reference optical path ROP and a measurement optical path MOP may result at least in part from the dispersion portion. More specifically, the dispersion portion DP may result in a dispersion of the light in the reference optical path ROP that is different than a dispersion of the light in the measurement optical path MOP, as corresponding to the imbalanced dispersion between the reference optical path ROP and the measurement optical path MOP (e.g., as may be utilized as part of the process for determining a measurement distance to the workpiece WP).

More specifically, when the combined light is converted into a distance indicating electrical signal, there may be two distances that correspond to the distance indicating electrical signal (i.e., depending on whether the measurement optical path length MOPL is longer or shorter than the reference optical path length ROPL). As a simplified example, a same distance indicating signal may result from a condition in which $MOPL-ROPL=x_D$ (i.e., where the measurement optical path MOP is longer than the reference optical path ROP by the amount $x_D$), and a condition in which $MOPL-ROPL=-x_D$ (i.e., where the measurement optical path MOP is shorter than the reference optical path ROP by the amount $x_D$). By including a dispersion portion in the system to create an imbalanced dispersion, along with performing certain related processing, the ambiguity between such conditions may be resolved so that the correct measurement distance to the workpiece may be determined. Techniques and configurations utilizing such a dispersion portion are described in more detail in U.S. Patent Application entitled "METROLOGY SYSTEM UTILIZING FULL RANGE DETECTION", U.S. patent application Ser. No. 19/005,052, filed on Dec. 30, 2024), which is commonly assigned and filed concurrently herewith and is hereby incorporated herein by reference in its entirety.

As will be described in more detail below with respect to FIGS. 5-13, various advantages may be achieved in accordance with implementations as described herein. In various implementations, it will be appreciated that certain spectral domain optical coherence tomography (SD-OCT) techniques may have advantages over certain frequency-modulated continuous wave (FMCW) techniques (e.g., as may also be referenced as swept source optical coherence tomography (SS-OCT) techniques). Some such advantages may include a wider measurement bandwidth, which in some instances may support a higher measurement accuracy. In addition, a broadband incoherent light source may be utilized (e.g., at potentially lower cost in relation to certain laser light sources as required for FMCW, etc.). Also, all phases may be measured at a same time (e.g., which in some implementations may be referenced as single shot measurements), avoiding certain acquisition timing errors and doppler shifts.

However, certain prior systems utilizing SD-OCT have had various limitations. For example, the coherence length of the broadband source may have been limited by the optical resolution of the spectrometer (e.g., which in some implementations may have been on the order of 100 GHz). This factor has in some instances limited the coherence length of the system (e.g., in one specific example to approximately 1 mm). In various implementations, the spectrometer resolution has been limited by the grating period, number of diffraction rulings that are illuminated and the number of pixels in the detector (i.e., of the spectrometer). In various implementations, the linear detector pixel numbers have been limited to 2000-4000. The number of pixels on the detector (assuming the optical resolution has been sufficient) has limited the system dynamic range (i.e., corresponding to longest vs shortest distances).

In accordance with principles as described herein, improving the light source coherence length is achieved in various implementations by adding one or more optical filters (e.g., adding one or more etalon filters) in an optical path (e.g., after a branching portion but before a spectrometer portion), or including a light portion with an optical filter (e.g., an etalon filter), or a light source that otherwise produces a series of spectral peaks. In accordance with such techniques, a signal may be relatively evenly spaced in frequency, even though the spectrometer is used, avoiding the need for resampling.

Several measurement techniques are described herein which may be utilized to extend the absolute (ABS) range to utilize the increased coherence length. For example, two measurements may be performed with significantly different frequency spacing (e.g., as described in more detail below with respect to FIGS. 6 and 7, etc.), such that one measurement can resolve the maximum length scale (ABS) and the other measurement can resolve the minimum length scale (fine position). The two measurements are combined to provide fine position over larger ABS distance. As another example, a multi-measurement technique (e.g., as described in more detail below with respect to FIGS. 8 and 9, etc.) may be used to extend the measurement range. Each measurement may acquire data over the full bandwidth at different sampling intervals (e.g., as set by the optical filters, such as etalon filters). As another example, single or multiple measurements may be performed with samples unevenly spaced in the frequency domain (e.g., as described in more detail below with respect to FIGS. 10 and 11, etc.). Such techniques may be realized by utilizing a dispersive medium in the optical filter(s) (e.g., etalon filter(s)). The non-uniform sampling provides an ABS position determination for a much larger range. Combining one un-evenly sampled measurement with one evenly sampled measurement (e.g., in accordance with the configuration of FIG. 11) enables an ABS and fine position determination.

In various implementations, to increase coherence length it may be desirable to reduce the frequency bandwidth on each pixel of a spectrometer. In certain previously known systems, this may have been difficult to achieve with existing spectrometers, since the pixel size may act as a limiting aperture and such linear detectors may typically have less than 5000 pixels. In various implementations as described herein, by adding an optical filter (e.g., an optical frequency filter such as an etalon filter) or otherwise providing light with a series of spectral peaks, such may effectively narrow the frequency bandwidth that reaches each pixel. In various implementations, a light portion may include such an optical filter (e.g., in front of a light source, or alternatively the light source itself may be configured to produce such light), or such an optical filter may be included in an optical path before a spectrometer portion (e.g., in some instances included immediately before or otherwise as an input to the spectrometer portion, such as in instances where two optical filters may be utilized for different measurements, etc.)

In various implementations, the frequency spacing (e.g., according to a free spectral range (FSR), such as of an etalon FSR, and as described in more detail below with respect to FIG. 5) may be chosen such that it is larger than the pixel size+optical resolution+detector spot size of the spectrometer. In various implementations, this may help ensure that each pixel of the spectrometer only sees/receives one frequency peak of the light from the optical filter (e.g., from the etalon filter). In various implementations, the spectral peak widths (e.g., corresponding to an etalon Q) of the series of spectral peaks is chosen to increase the coherence length to match the ABS range. In various implementations where a frequency spacing on a detector is not even, it may be desirable to generate a look-up table to reorder the detector pixel locations into evenly spaced frequency data (e.g., as generated as part of a one time calibration process).

In various implementations, an optical filter medium (e.g., an etalon filter medium) as used herein may be assumed to have relatively no dispersion (e.g., such as for an air spaced etalon filter). Such may help ensure that the peak spacing is equal and the data can directly apply an FFT (e.g., with no resampling necessary). This approach may also be applied for optical filters (e.g., etalon filters) with dispersion, but for which a non-uniform sampling calculation may be utilized. In various implementations, utilizing a non-dispersive optical filter (e.g., a non-dispersive etalon) may result in a highly linear and highly accurate frequency spacing for the SD-OCT data. As will be described in more detail below (e.g., with respect to FIG. 5), transmission of broadband light through an optical filter (e.g., an etalon filter) may result in light comprising a series of spectral peaks (e.g., which in some instances may be characterized as having a frequency comb-like structure). The spacing of the spectral peaks is given by the free spectral range (e.g., FSR, length of etalon) and the widths of the spectral peaks are given by the FSR/Q (e.g., wherein Q is a quality factor as is known in the art, for which a higher Q factor may correspond to a sharper peak, etc.).

In accordance with techniques such as those described above, in various implementations, light that is output from a light portion and that is received at the branching portion may comprise a series of spectral peaks (e.g., as described in more detail below with respect to FIG. 10, etc.). In various implementations, the light portion of such a configuration may include at least one of: an optical filter (e.g., an etalon filter) that is configured to filter light from a light source to provide the light with the series of spectral peaks; or a light source that is configured to provide the light with the series of spectral peaks (e.g., which in some instances may be characterized as being analogous to a frequency comb type light source). In certain other implementations, an optical filter portion may be located along an optical path between a branching portion and a spectrometer portion, for which the optical filter portion may comprise one or more optical filters (e.g., etalon filters), wherein each optical filter is configured to filter incoming light and produce light comprising a series of spectral peaks (e.g., as described in more detail below with respect to FIGS. 7-9 and 11, etc.). In relation to such configurations (e.g., of FIGS. 7-11), an example series of spectral peaks is illustrated in FIG. 5, as will be described in more detail below.

Figure 5:
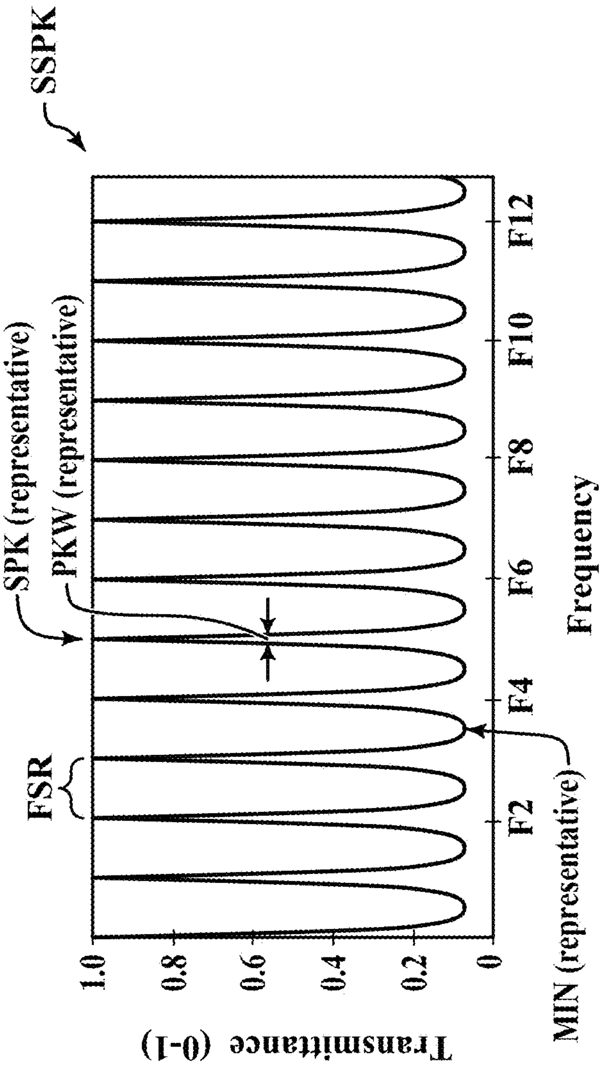
FIG. 5 is a diagram illustrating a series of spectral peaks.

FIG. 5 is a diagram illustrating a series of spectral peaks SSPK. FIG. 5 illustrates frequency (x-axis) vs transmittance (y-axis, with normalized values from 0 to 1) for the series of spectral peaks SSPK. In the simplified example of FIG. 5, the series of spectral peaks SSPK is illustrated as including approximately 12 spectral peaks SPK. It will be appreciated that in various implementations, a series of spectral peaks SSPK may include a greater number of spectral peaks (e.g., hundreds or thousands of spectral peaks) and for which there may be spectral peaks as corresponding to pixels (e.g., on a wavelength detector) of a spectrometer (e.g., in some implementations with a spectral peak for each pixel, or otherwise in accordance with certain principles as described herein).

In the example of FIG. 5, the spectral peaks are spaced according to a free spectral range (FSR) (e.g., with a representative FSR as illustrated for the peak frequencies F2 and F3 of the corresponding spectral peaks SPK). In various implementations, such an FSR may correspond to a spacing in optical frequency or wavelength between the peak frequencies of the spectral peaks. In various implementations, an optical filter (e.g., an etalon filter), may be characterized in accordance with a frequency or other designator that corresponds to the FSR (e.g., of a series of spectral peaks as produced by the optical filter). In FIG. 5, peak frequencies F1-F12 are indicated, each as corresponding to a spectral peak SPK.

Each of the spectral peaks SPK also has a peak width PKW (e.g., for which a representative peak width PKW is shown for the spectral peak having a peak frequency F5). In the example of FIG. 5, the spectral peaks SPK are illustrated as being evenly spaced (e.g., at a periodic frequency), although it will be appreciated that in other implementations there may be spacing variations between the spectral peaks in a series of spectral peaks (e.g., such as in accordance with certain un-even sampling techniques as described in more detail below with respect to FIGS. 10 and 11, etc.). In between the peak frequencies F1-F12 are minimums MIN (e.g., with a representative minimum MIN shown between the peak frequencies F3 and F4). In various implementations, the amplitude of the minimums MIN (e.g., corresponding to minimum values) may be less than 20%, or less than 10%, of the amplitude of the peak frequencies for the spectral peaks (e.g., as indicated by the illustrated transmittance values of less than 0.1 for the minimums MIN, as compared to the transmittance values of 1.0 for the peak frequencies).

As some specific example numerical values (e.g., for a normal incidence detector), in various implementations (e.g., such as those described below), an optical spectrum of light that may be provided/used may be in the range of 450 nm-650 nm, and a spectrometer that is utilized may have a 2400 lpm grating, and an optical filter that may be utilized may be a 200 GHz etalon FSR (1.45 mm free space etalon), which in this example may provide/correspond to 1022 frequency measurements, and a linear detector (of a spectrometer) that may be utilized may be a 20 mm long linear detector, with 2048 pixels. In various implementations, to avoid multiple spectral peaks from contributing to the signal on a single pixel, it may be desirable for the frequency peak spacing to be larger than the combination of pixel spacing, grating optical resolution, and spot size on the detector.

As another specific numerical example (e.g., for a grating spectrometer, such as with a 2400 lpm grating), a highly dispersive optical filter may be utilized (e.g., an optical filter for large dispersion in the 500 nm-600 nm spectra, such as a 285 GHz nominal etalon FSR (0.202 mm ZnSe etalon)), as may result in 600 frequency measurements, with a 20 mm long linear detector, with 2048 pixels. In various implementations, the dispersive grating may increase the spacing variation on the detector (e.g., which may reduce the number of distinct optical peaks that can be observed on the spectrometer). As another specific numerical example (e.g., for a prism spectrometer, such as with a SF11 prism spectrometer), a highly dispersive optical filter may be utilized (e.g., an optical filter for large dispersion in the 500 nm-600 nm spectra, such as a 170 GHz nominal etalon FSR (0.336 mm ZnSe etalon)), as resulting in 1000 frequency measurements, with a 20 mm long linear detector, having 2048 pixels, and for which the peak spacing may be relatively more uniform when utilizing the dispersive etalon filter.

Figure 6:
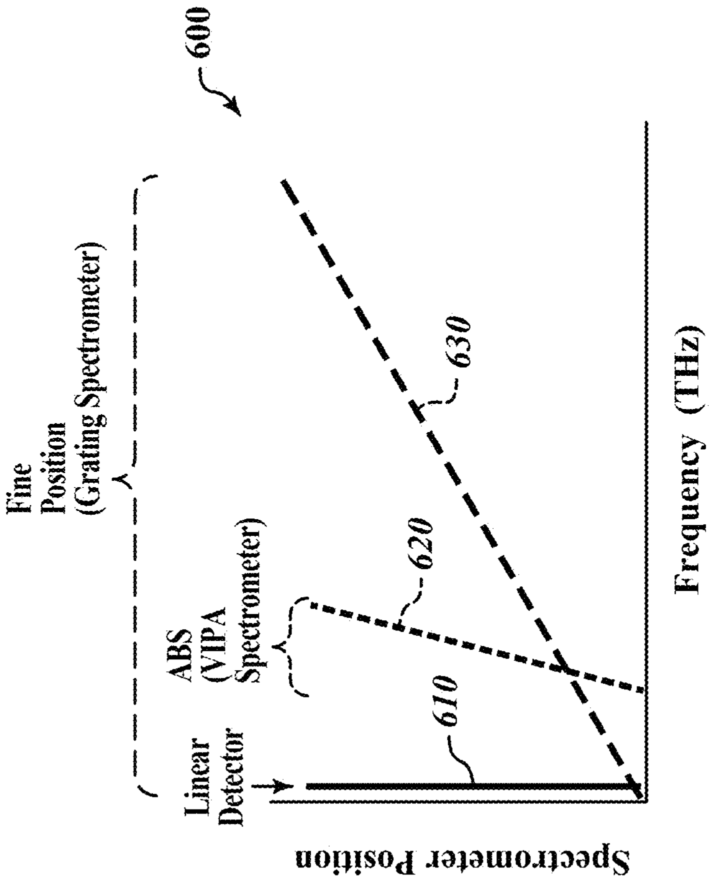
FIG. 6 is a diagram illustrating certain frequency and spectrometer relationships.

FIG. 6 is a diagram illustrating certain frequency and spectrometer relationships, which are related to certain configurations as described herein (e.g., as will be described in more detail below with respect to FIG. 7, etc.) FIG. 6 illustrates frequency (x-axis) vs spectrometer position (y-axis) for a series of plotted lines (e.g., in relation to a method utilizing an absolute (ABS) position measurement and a fine position measurement). More specifically, a plotted line 610 corresponds to a linear detector, a plotted line 620 corresponds to a virtually imaged phase array (VIPA) spectrometer (e.g., for an absolute (ABS) position), and a plotted line 630 corresponds to a grating spectrometer (e.g., for a fine position).

In relation to the illustrations of FIG. 6, it will be appreciated that in various implementations, even with a coherent signal, a sample frequency resulting from covering a large bandwidth with a spectrometer measurement limits the unambiguous range (i.e., limits the ABS distance). In various implementations, this limit may result from aliasing (e.g., of a higher frequency signal on the larger frequency steps). In various implementations, this aliasing multiple may be determined by use of a second, small bandwidth measurement with fine frequency steps. The fine frequency steps may be realized with an alternative spectrometer architecture (e.g., such as VIPA). In various implementations, to resolve the aliased signal on the fine position measurement (e.g., large bandwidth with periodic sampling), a means to break the sign ambiguity may be desirable (e.g., utilizing dispersion compensation in accordance with inclusion of a dispersion portion such as $DP_M$ or $DP_F$ as noted above with respect to FIGS. 2 and 3, or utilizing quadrature detection, etc.). In various implementations, the two spectrometers (e.g., VIPA and grating based) may have overlapping spectra or may be spectrally offset (e.g., wavelength multiplexed). A configuration with the two spectrometers (e.g., a VIPA spectrometer SM1V and a grating spectrometer SM2G) will be described in more detail below with respect to FIG. 7, etc.

As will be described in more detail below, FIGS. 7-11 illustrate implementations of portions 700, 800, 900, 1000 and 1100 of a metrology system, such as may be included in a metrology system such as that of FIGS. 1, 3 and/or 4 as described above. It will be appreciated that certain numbered or otherwise labeled components of FIGS. 7-11 (e.g., branching portion 120, circulator portion 125, detector portion 140VG, optical fiber OF1, etc.) may correspond to and/or have similar or identical operations and/or functions as similarly numbered or otherwise labeled components in any of FIGS. 3 and/or 4 (e.g., branching portion $\mathbf{120}_F$, circulator portion 125, detector portion 140, optical fiber OF1, etc.), and may be understood by analogy thereto and/or as otherwise described below. This numbering scheme to indicate elements having analogous design and/or function may also be applied to other figures as described herein. In addition, with respect to FIGS. 7-11, it will be understood that as part of a metrology system (e.g., as part of the metrology system of FIGS. 1, 3 and/or 4), the illustrated components may be coupled to other components and/or otherwise operate in accordance with principles and operations as described above.

For example, a light portion 110 (e.g., as comprising a light source LS) of FIGS. 7-11 may be part of an interferometer portion (e.g., interferometer portion 101 of FIGS. 1 and/or 3) and may be coupled to and/or otherwise controlled by a control portion (e.g., control portion 180 of FIG. 4) of a circuitry portion 102. As another example, a detector portion 140 (e.g., as including a spectrometer portion SP, etc.) of FIGS. 7-11 may be part of a detector and processing portion (e.g., detector and processing portion DPP of FIG. 4) and may provide signals to a processing portion and/or with signals subsequently provided to a control portion (e.g., processing portion 150 and/or control portion 180 of FIG. 4), etc. In various implementations, an optical filter portion FP (e.g., of FIGS. 7, 8, 9 and 11) may be included as part of a detector portion 140 (e.g., as part of a circuitry portion 102) or may otherwise be included in the system. In general, it will be understood that in various implementations the upper components illustrated in FIGS. 7-11 (e.g., components 110, 120, 125, 134, 139, etc.) may be part of an interferometer portion (e.g., interferometer portion 101 of FIGS. 1, 3 and/or 4) and that the lower components (e.g., component 140, etc.) may be part of a circuitry portion (e.g., circuitry portion 102 of FIGS. 1, 3 and/or 4) and may have similar or identical operations and/or functions as the similarly labeled components as described above.

Figure 7:
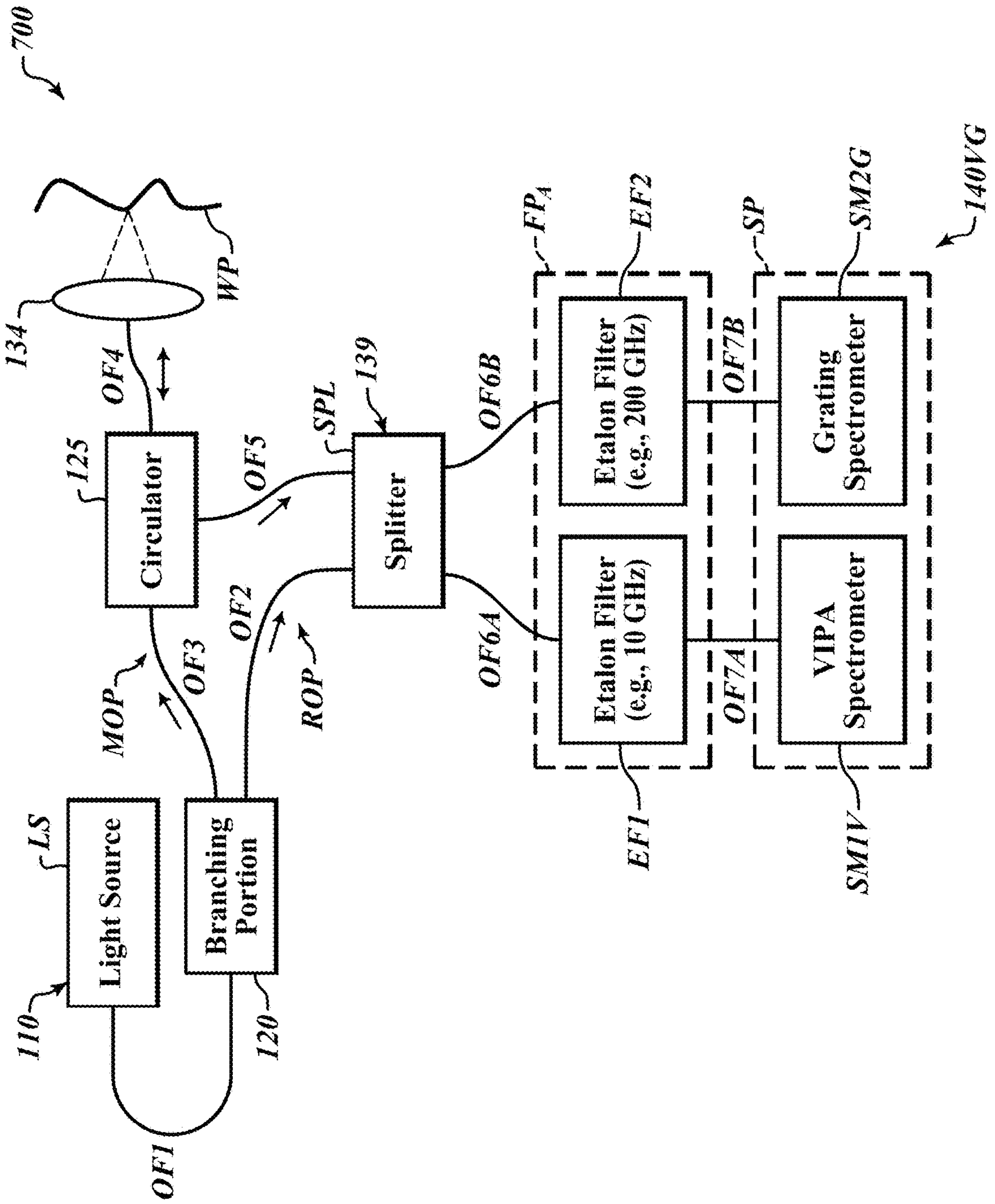
FIG. 7 is a block diagram illustrating a first implementation of a portion of a metrology system including a spectrometer portion.

FIG. 7 is a block diagram illustrating a first implementation of a portion 700 of a metrology system (e.g., for which certain principles are described above with respect to FIG. 6). As shown in FIG. 7, the metrology system includes a light portion 110 (e.g., comprising a light source LS), a branching portion 120, a circulator portion 125, an optical head portion 134, a combining portion 139 (e.g., comprising an optical splitter SPL), an optical filter portion $FP_A$ and a spectrometer portion SP. In various implementations, the spectrometer portion SP and/or the optical filter portion $FP_A$ may be included in a detector portion 140VG (e.g., as part of a detector and processing portion DPP of a circuitry portion 102, such as described above with respect to FIGS. 1, 3 and 4).

In general, the operations of the portions 110, 120, 125, 134 and 139 may be similar or identical to those of the similarly labeled components of FIG. 3, except as otherwise described below. Briefly, similar to the couplings in FIG. 3, in FIG. 7 optical fibers OF1-OF6B are shown to connect the different portions for providing light to and/or from the different portions. More specifically, the light portion 110 is coupled to the branching portion 120 by an optical fiber OF1. The branching portion 120 is coupled to the combining portion 139 by an optical fiber OF2, and is coupled to the circulator portion 125 by an optical fiber OF3. The circulator portion 125 is coupled to the optical head portion 134 by an optical fiber OF4, and is coupled to the combining portion 139 by an optical fiber OF5. As will be described in more detail below, the combining portion 139 is coupled to the optical filter portion $FP_A$ by optical fibers OF6A and OF6B, and the optical filter portion $FP_A$ is coupled to the spectrometer portion SP by optical fibers OF7A and OF7B.

In general, the metrology system directs light toward a workpiece WP (e.g., for measuring a distance to the workpiece WP, such as described above with respect to FIGS. 1-4). In various implementations, the metrology system may optically measure a distance to the workpiece, such as between the optical head portion 134 and the workpiece WP (e.g., and in various implementations may also measure a three-dimensional shape and/or surface characteristics of the workpiece WP, such as by scanning the position of light irradiated on the workpiece WP, such as for measuring different points on a surface of the workpiece WP).

As described above, in various implementations the combining portion 139 receives, from the circulator portion 125, the reflected light that is the measurement light radiated onto and reflected from the workpiece WP. Also, the combining portion 139 receives the reference light from the branching portion 120. The combining portion 139 combines/mixes the reflected measurement light and the reference light, and provides a corresponding output(s). In various implementations, the combining portion 139 comprises a fiber optic splitter SPL (e.g., as may also be referenced as a fiber optic coupler and/or a fiber optic combiner), and which in various implementations may perform certain combining and/or splitting functions, as is known in the art for such fiber optic splitters.

In the specific example of FIG. 7, the combining portion 139 provides outputs through optical fibers OF6A and OF6B (e.g., for which in various implementations the two outputs may be functionally similar, and may each include combined light in accordance with the operations of the combining portion 139). The optical filter portion $FP_A$ includes an optical filter EF1 and an optical filter EF2. The optical fiber OF6A is coupled to the optical filter EF1 and the optical fiber OF6B is coupled to the optical filter EF2 (i.e., thus coupling each of the optical filters EF1 and EF2 to the respective outputs of the combining portion 139). In various implementations, the optical filters EF1 and EF2 may be etalon filters (e.g., for which etalon filters as referenced herein may also or alternatively be referenced as Fabry-Pérot filters or Fabry-Pérot interferometers). In certain implementations, the optical filter EF1 may be a 10 GHz etalon filter, and the optical filter EF2 may be a 200 GHz etalon filter.

As noted above, the optical filter portion $FP_A$ is coupled to the spectrometer portion SP by optical fibers OF7A and OF7B. The spectrometer portion SP includes a spectrometer SM1V and a spectrometer SM2G. The optical filter EF1 is coupled to the spectrometer SM1V by the optical fiber OF7A. The optical filter EF2 is coupled to the spectrometer SM2G by the optical fiber OF7B. In various implementations, the spectrometer SM1V may be a virtually imaged phased array (VIPA) spectrometer, and the spectrometer SM2G may be a grating spectrometer (e.g., as described above with respect to FIG. 6).

In the illustrated configuration, the optical filter portion $FP_A$ is located along an optical path between the branching portion 120 and the spectrometer portion SP (e.g., and in this particular example is more specifically located along an optical path between the combining portion 139 and the spectrometer portion SP). In accordance with principles as described herein, each optical filter EF1 and EF2 of the optical filter portion $FP_A$ is configured to filter incoming light and produce light comprising a series of spectral peaks (e.g., as may be analogous to a series of spectral peaks as described above with respect to FIG. 5). The spectrometer portion SP of the detector portion 140VG is configured to receive light comprising a series of spectral peaks as provided by the optical filter portion $FP_A$. More specifically, the first optical filter EF1 is coupled to the first spectrometer SM1V and is configured to provide first light comprising a series of spectral peaks to the first spectrometer SM1V, and the second optical filter EF2 is coupled to the second spectrometer SM2G and is configured to provide second light comprising a series of spectral peaks to the second spectrometer SM2G. As noted above, the first and second optical filters EF1 and EF2 have different frequency properties (e.g., 10 GHz and 200 GHz) such that the first light that is provided to the first spectrometer SM1V is different than the second light that is provided to the second spectrometer SM2G.

As will be described in more detail below, FIGS. 8 and 9 relate to a technique utilizing two measurements (e.g., with configurations with two corresponding spectrometers SM1 and SM2). In various implementations, such techniques may be characterized as being part of a multi-measurement method (e.g., utilizing a synthetic ABS measurement). It will be appreciated that in various implementations such techniques may be particularly well suited for utilization with SD-OCT, due at least in part to an aspect that a finer frequency resolution may be achieved with a passive optical component (e.g., an optical filter such as an etalon filter, etc.). In various implementations, such configurations may generally be more robust than certain alternative configurations that may utilize FMCW (e.g., with respect to certain limited timing resolution/accuracy that may be achieved with certain FMCW configurations).

In various implementations, a configuration utilizing SD-OCT may achieve a two-measurement technique by splitting a return signal into two spectrometers (e.g., spectrometers SM1 and SM2 as will be described in more detail below with respect to FIGS. 8 and 9) for simultaneous measurements. In various implementations, a ratio of the FSR of the optical filters (e.g., etalon filters) may be selected to match the two-measurement requirements. For example, in one specific implementation, a ratio of the FSR may be selected according to n2/n1=10/11 (e.g., such as an FSR ratio corresponding to 200 GHz/220 GHz) in order to achieve a 10× extension in the ABS range. In various implementations, it may be desirable for such a multi-measurement technique to utilize an entire available frequency range (±frequency measurements), for which it may be desirable to utilize dispersion compensation in accordance with inclusion of a dispersion portion such as $DP_M$ or $DP_F$ as noted above with respect to FIGS. 2 and 3 (e.g., and which in certain implementations may be considered advantageous over techniques utilizing quadrature detection which may be more difficult to implement in certain systems utilizing SD-OCT).

In certain alternative configurations (e.g., also utilizing SD-OCT), a system may utilize a single spectrometer and may switch between the two optical filters (e.g., etalon filters). However, an advantage of instead utilizing two spectrometers may be the ability to simultaneously determine measurements (e.g., thus avoiding a risk of a moving workpiece having too much movement between measurements, such as may in certain instances cause an ABS calculation to result in certain inaccuracies or otherwise fail). Certain example configurations with two spectrometers will be described in more detail below with respect to FIGS. 8 and 9.

Figure 8:
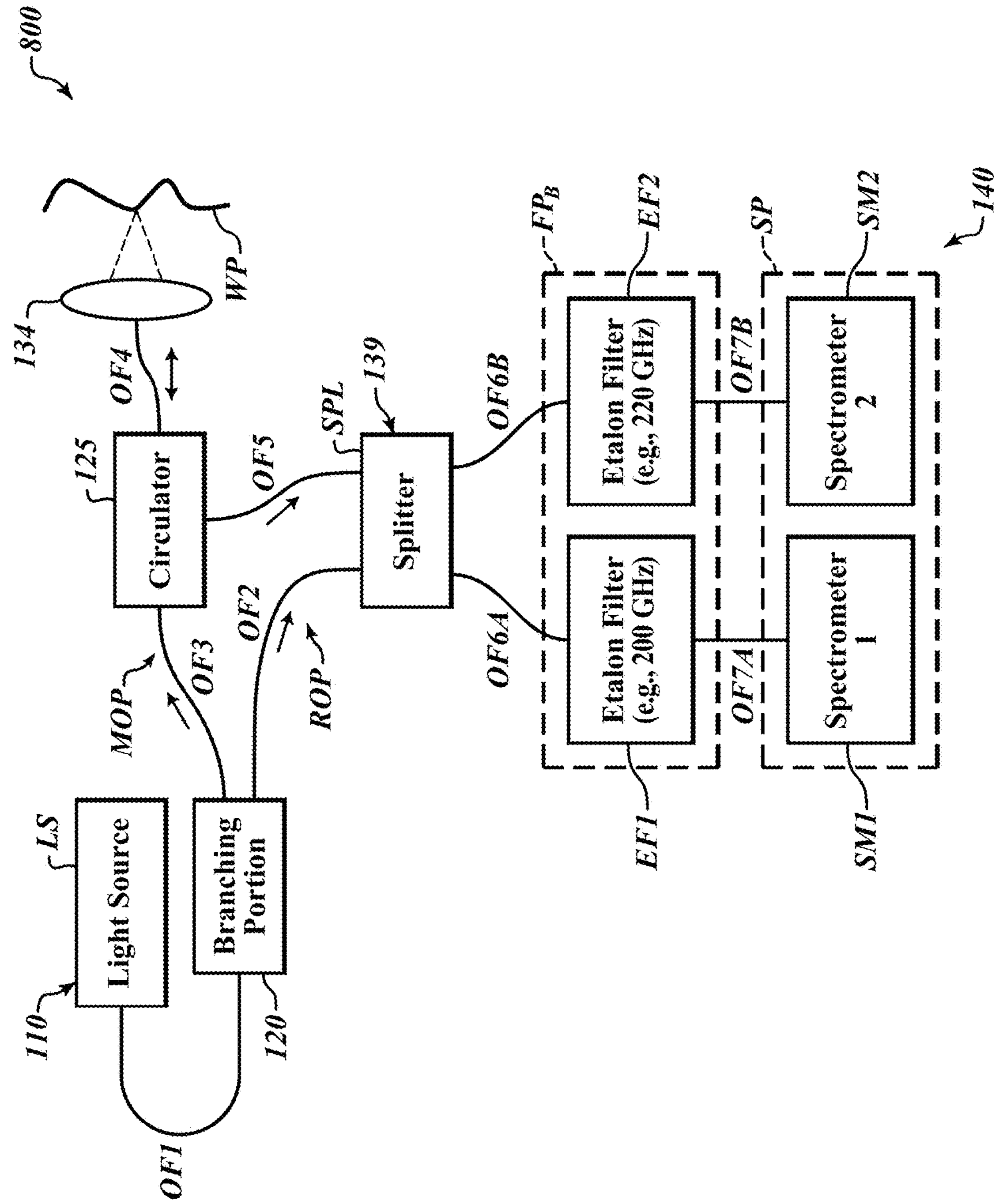
FIG. 8 is a block diagram illustrating a second implementation of a portion of a metrology system including a spectrometer portion.

FIG. 8 is a block diagram illustrating a second implementation of a portion 800 of a metrology system. As shown in FIG. 8, the metrology system includes a light portion 110 (e.g., comprising a light source LS), a branching portion 120, a circulator portion 125, an optical head portion 134, a combining portion 139 (e.g., comprising an optical splitter SPL), an optical filter portion $FP_B$ and a spectrometer portion SP. In various implementations, the spectrometer portion SP and/or the optical filter portion $FP_B$ may be included in a detector portion 140 (e.g., as part of a detector and processing portion DPP of a circuitry portion 102, such as described above with respect to FIGS. 1, 3 and 4). In general, the operations and couplings of the portions 110, 120, 125, 134 and 139 may be similar or identical to those of FIG. 7, and may be understood in accordance with the above description of FIG. 7.

In the specific example of FIG. 8, the combining portion 139 provides outputs through optical fibers OF6A and OF6B (e.g., for which in various implementations the outputs may be functionally similar, and may each include combined light in accordance with the operations of the combining portion 139). The optical filter portion $FP_B$ includes an optical filter EF1 and an optical filter EF2. The optical fiber OF6A is coupled to the optical filter EF1 and the optical fiber OF6B is coupled to the optical filter EF2 (i.e., thus coupling each of the optical filters EF1 and EF2 to the respective outputs of the combining portion 139). In various implementations, the optical filters EF1 and EF2 may be etalon filters. In certain implementations, the optical filter EF1 may be a 200 GHz etalon filter, and the optical filter EF2 may be a 220 GHz etalon filter.

The optical filter portion $FP_B$ is coupled to the spectrometer portion SP by optical fibers OF7A and OF7B. The spectrometer portion SP includes a spectrometer SM1 and a spectrometer SM2. The optical filter EF1 is coupled to the spectrometer SM1 by the optical fiber OF7A. The optical filter EF2 is coupled to the spectrometer SM2 by the optical fiber OF7B.

In the illustrated configuration, the optical filter portion $FP_B$ is located along an optical path between the branching portion 120 and the spectrometer portion SP (e.g., and in this particular example is more specifically located along an optical path between the combining portion 139 and the spectrometer portion SP). In accordance with principles as described herein, each optical filter EF1 and EF2 of the optical filter portion $FP_B$ is configured to filter incoming light and produce light comprising a series of spectral peaks (e.g., as may be analogous to a series of spectral peaks as described above with respect to FIG. 5). The spectrometer portion SP of the detector portion 140 is configured to receive light comprising a series of spectral peaks as provided by the optical filter portion $FP_B$. More specifically, the first optical filter EF1 is coupled to the first spectrometer SM1 and is configured to provide first light comprising a series of spectral peaks to the first spectrometer SM1, and the second optical filter EF2 is coupled to the second spectrometer SM2 and is configured to provide second light comprising a series of spectral peaks to the second spectrometer SM2. As noted above, the first and second optical filters EF1 and EF2 have different frequency properties (e.g., 200 GHz and 220 GHz) such that the first light that is provided to the first spectrometer SM1 is different than the second light that is provided to the second spectrometer SM2.

Figure 9:
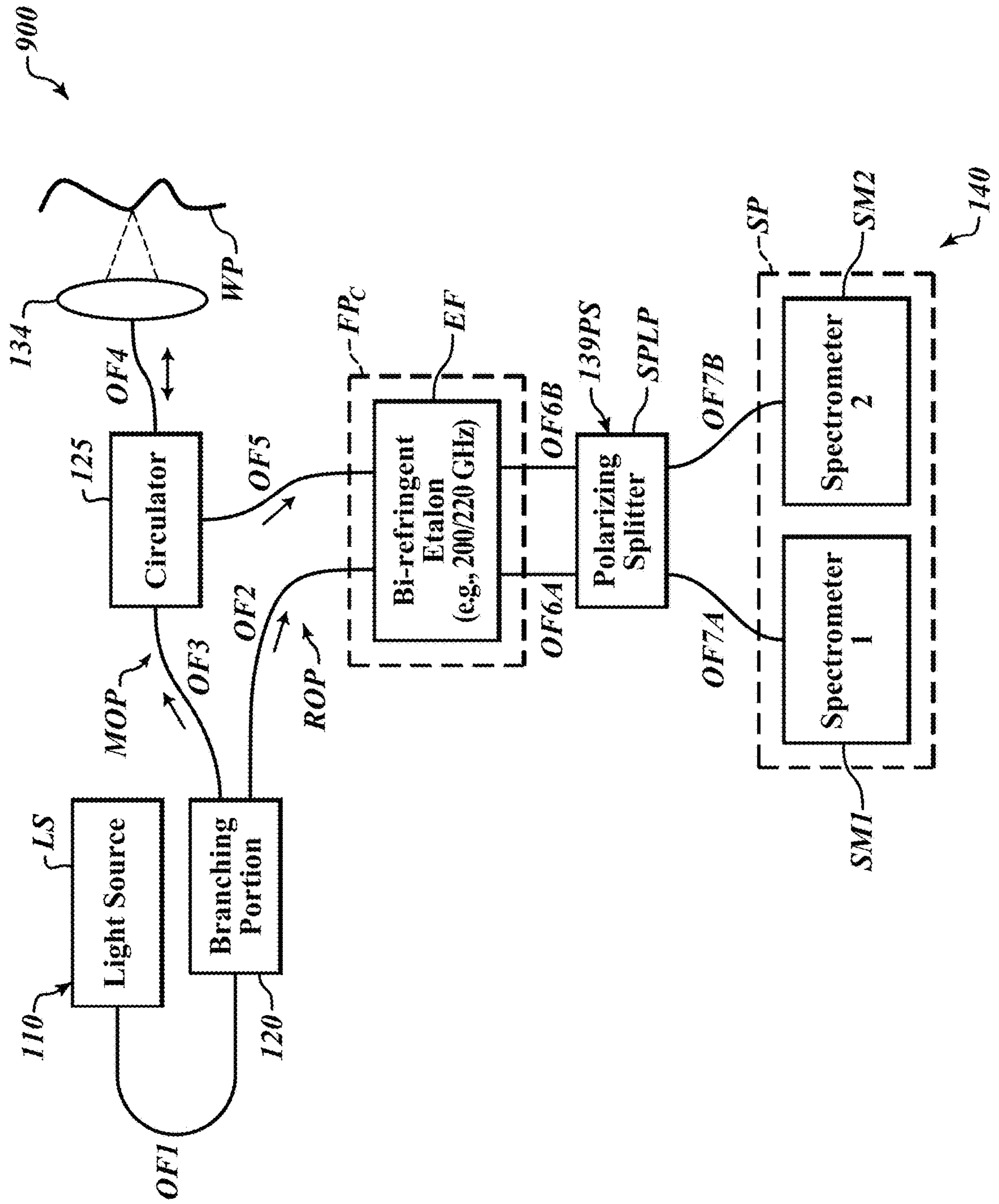
FIG. 9 is a block diagram illustrating a third implementation of a portion of a metrology system including a spectrometer portion.

FIG. 9 is a block diagram illustrating a third implementation of a portion 900 of a metrology system. As shown in FIG. 9, the metrology system includes a light portion 110 (e.g., comprising a light source LS), a branching portion 120, a circulator portion 125, an optical head portion 134, an optical filter portion $FP_C$, a combining portion 139PS (e.g., comprising an optical splitter SPL) and a spectrometer portion SP. In various implementations, the spectrometer portion SP may be included in a detector portion 140 (e.g., as part of a detector and processing portion DPP of a circuitry portion 102, such as described above with respect to FIGS. 1, 3 and 4). In general, the operations and couplings of the portions 110, 120, 125 and 134 may be similar or identical to those of FIG. 7, and may be understood in accordance with the above description of FIG. 7.

In the illustrated configuration, the optical filter portion $FP_C$ is located along an optical path between the branching portion 120 and the spectrometer portion SP (e.g., and in this particular example is more specifically located along an optical path before the combining portion 139PS). The optical filter portion $FP_C$ includes an optical filter EF. In various implementations, the optical filter portion $FP_C$ receives, from the circulator portion 125, the reflected light that is the measurement light radiated onto and reflected from the workpiece WP. Also, the optical filter portion $FP_C$ receives the reference light from the branching portion 120. More specifically, in various implementations the branching portion 120 is coupled by the optical fiber OF2 to an input of the optical filter EF, and the circulator portion 125 is coupled by the optical fiber OF5 to an input of the optical filter EF. In various implementations, the optical filter EF is an etalon filter. More specifically, the optical filter EF may be a 200/220 GHz bi-refringent etalon filter.

The optical filter portion $FP_C$ is coupled by optical fibers OF6A and OF6B to the combining portion 139PS. More specifically, an output of the optical filter EF is coupled by the optical fiber OF6A to an input of the combining portion 139PS, and an output of the optical filter EF is coupled by the optical fiber OF6B to an input of the combining portion 139PS. The combining portion 139PS combines/mixes the reflected measurement light and the reference light (i.e., as provided through the optical fibers OF6A and OF6B), and provides a corresponding output(s). In various implementations, the combining portion 139 comprises a fiber optic polarizing splitter SPLP (e.g., as may also be referenced as a fiber optic polarizing coupler and/or a fiber optic polarizing combiner), and which in various implementations may perform certain combining and/or splitting functions, as is known in the art for such fiber optic polarizing splitters.

In the specific example of FIG. 9, the combining portion 139PS provides outputs through optical fibers OF7A and OF7B (e.g., for which in various implementations the two outputs may be functionally similar, and may each include combined light in accordance with the operations of the combining portion 139PS). The combining portion 139PS is coupled to the spectrometer portion SP by the optical fibers OF7A and OF7B. The spectrometer portion SP includes a spectrometer SM1 and a spectrometer SM2. An output of the combining portion 139PS is coupled to the spectrometer SM1 by the optical fiber OF7A. An output of the combining portion 139PS is coupled to the spectrometer SM2 by the optical fiber OF7B.

In the illustrated configuration, the optical filter portion $FP_C$ is located along an optical path between the branching portion 120 and the spectrometer portion SP. In accordance with principles as described herein, the optical filter EF of the optical filter portion $FP_C$ is configured to filter incoming light and produce light comprising a series of spectral peaks (e.g., as may be analogous to a series of spectral peaks as described above with respect to FIG. 5). The spectrometer portion SP of the detector portion 140 is configured to receive light comprising a series of spectral peaks as provided by the optical filter portion $FP_C$ (e.g., in this example as provided through the combining portion 139PS).

As will be described in more detail below, FIG. 10 relates to a technique utilizing un-even sampling for achieving an extension of the measuring range. In certain example implementations as described above (e.g., with respect to FIGS. 7 and 8), two non-dispersive optical filters (e.g., etalon filters) are utilized which generate equal spacing between frequency peaks (e.g., of a series of spectral peaks, and which may be characterized in some instances as a "no dispersion" implementation). Such implementations may correspond to a relatively straightforward position calculation with an FFT, although also require the two-measurement technique to extend to the larger ABS range (e.g., and in some instances to disambiguate the multiple signal peaks).

In various implementations, a limitation on the ABS range may be characterized as resulting from a highest unambiguous "beat" frequency that can be measured. In various implementations, if a deviation from even sampling is utilized, higher beat frequencies may be identified. In various implementations (e.g., as will be described in more detail with respect to FIG. 10), a single highly dispersive optical filter (e.g., a dispersive etalon filter) may be utilized to make un-even spacing between the frequency peaks (e.g., of a series of spectral peaks). In various implementations, the frequency spacing may be smaller at shorter wavelengths (higher refractive index at shorter wavelengths), which increases the peak spacing variation on the spectrometer. An implementation which is configured in accordance with and to utilize such techniques is described in more detail below with respect to FIG. 10.

Figure 10:
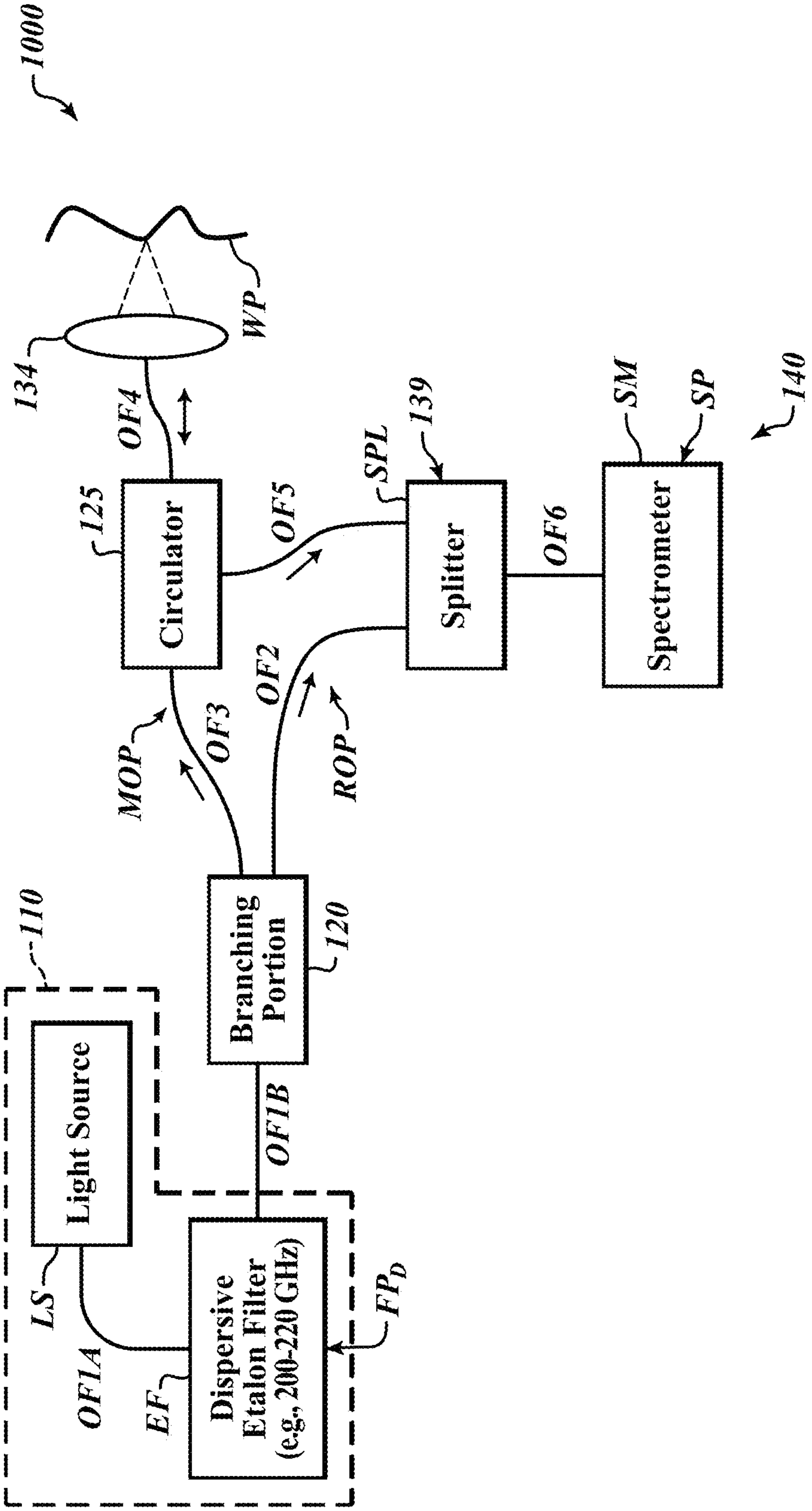
FIG. 10 is a block diagram illustrating a fourth implementation of a portion of a metrology system including a spectrometer portion.

FIG. 10 is a block diagram illustrating a fourth implementation of a portion 1000 of a metrology system. As shown in FIG. 10, the metrology system includes a light portion 110, a branching portion 120, a circulator portion 125, an optical head portion 134, a combining portion 139 (e.g., comprising an optical splitter SPL) and a spectrometer portion SP. In various implementations, the spectrometer portion SP may be included in a detector portion 140 (e.g., as part of a detector and processing portion DPP of a circuitry portion 102, such as described above with respect to FIGS. 1, 3 and 4).

In the specific example of FIG. 10, in various implementations the light portion 110 may include a light source LS and an optical filter portion $FP_D$. The light source LS is coupled by an optical fiber OF1A to the optical filter portion $FP_D$, and the optical filter portion $FP_D$ is coupled to the branching portion 120 by an optical fiber OF1B. The optical filter portion $FP_D$ comprises an optical filter EF. In various implementations, the optical filter EF may be an etalon filter (e.g., for which an etalon filter as referenced herein may also or alternatively be referenced as a Fabry-Pérot filter or a Fabry-Pérot interferometer). In certain implementations, the optical filter EF may be a 200-220 GHz dispersive etalon filter. In an alternative configuration where the light portion 110 includes only the light source LS (e.g., and does not include the optical filter portion $FP_D$), the light source LS may be coupled by an optical fiber (e.g., an optical fiber OF1, such as illustrated in FIG. 3) to the branching portion 120.

In various implementations, the light that is output from the light portion 110 and that is received at the branching portion 120 comprises (e.g., consists of) a series of spectral peaks (e.g., as may be analogous to a series of spectral peaks as described above with respect to FIG. 5). In various implementations, the optical filter EF (e.g., an etalon filter) of the optical filter portion $FP_D$ is configured to filter light from the light source LS to provide the light with the series of spectral peaks. In an alternative configuration (e.g., which does not include the optical filter portion $FP_D$), a light source LS may be configured to provide the light with the series of spectral peaks. For example, in various implementations of the configuration of FIGS. 3 and 4, the light portion 110 may comprise a light source that may be configured to provide the light with the series of spectral peaks, and the detector portion 140 of the detector and processing portion DPP may comprise the spectrometer SM of the spectrometer portion SP. In some implementations, such a light source LS may be analogous to a frequency comb type light source and/or as implemented utilizing a photonic integrated circuit or other technologies and/or as otherwise producing a frequency comb like light structure (i.e., in the form of a series of spectral peaks such as those described above with respect to FIG. 5).

In general, the operations of certain other portions 120, 125, 134 and 139 of FIG. 10 may be similar or identical to those of the similarly labeled components of FIGS. 3, 7 etc., except as otherwise described below. Briefly, similar to the couplings in FIGS. 3, 7, etc., in FIG. 10 the branching portion 120 is coupled to the combining portion 139 by an optical fiber OF2, and is coupled to the circulator portion 125 by an optical fiber OF3. The circulator portion 125 is coupled to the optical head portion 134 by an optical fiber OF4, and is coupled to the combining portion 139 by an optical fiber OF5. The combining portion 139 is coupled by an optical fiber OF6 to the spectrometer portion SP.

In general, the metrology system directs light toward a workpiece WP (e.g., for measuring a distance to the workpiece WP, such as described above with respect to FIGS. 1-4). In various implementations, the metrology system may optically measure a distance to the workpiece, such as between the optical head portion 134 and the workpiece WP (e.g., and in various implementations may also measure a three-dimensional shape and/or surface characteristics of the workpiece WP, such as by scanning the position of light irradiated on the workpiece WP, such as for measuring different points on a surface of the workpiece WP).

As described above, in various implementations the combining portion 139 receives, from the circulator portion 125, the reflected light that is the measurement light radiated onto and reflected from the workpiece WP. Also, the combining portion 139 receives the reference light from the branching portion 120. The combining portion 139 combines/mixes the reflected measurement light and the reference light, and provides a corresponding output. In various implementations, the combining portion 139 comprises a fiber optic splitter SPL (e.g., as may also be referenced as a fiber optic coupler and/or a fiber optic combiner), and which in various implementations may perform certain combining and/or splitting functions, as is known in the art for such fiber optic splitters. In various implementations, the reference light, the measurement light, and/or the combined light may each comprise a series of spectral peaks (e.g., in accordance with the series of spectral peaks as provided by the light portion 110).

The combining portion 139 provides the corresponding output to the spectrometer portion SP. The spectrometer portion SP comprises a spectrometer SM. In the example of FIG. 10, the combining portion 139 is coupled by the optical fiber OF6 to the spectrometer SM, and correspondingly provides the output (e.g., comprising the combined light) to the spectrometer SM.

As will be described in more detail below, FIG. 11 relates to a technique utilizing a combination of the periodic and un-even sampling techniques described above. In general, the multi-measurement approach (e.g., of the implementations of FIGS. 8 and 9) may require a relatively accurate ratio between the FSRs of the optical filters (e.g., the FSRs of the etalon filters). In some instances, a manufacturing thickness tolerance (e.g., corresponding to a ratio error) may limit the range extension ratio. In contrast, the un-even sampling method (e.g., of the implementation of FIG. 10) may have an advantage that a single real valued measurement allows for a long ABS range (e.g., but in certain implementations may have certain issues with a signal-to noise ratio (SNR)).

In various implementations, a configuration may be utilized that combines certain strengths of the above noted techniques (e.g., and which may enable lower manufacturing tolerances, etc.). Such a configuration may combine a periodic (e.g., dispersionless) optical filter (e.g., etalon filter) measurement for fine position determination, with an unevenly sampled (e.g., dispersive) optical filter (e.g., etalon filter) measurement for ABS position determination. This approach has no stringent relative tolerance requirement in relation to the ratio between the two optical filters (e.g., between the two etalon filters). In various implementations, the outputs of the two optical filters may be measured simultaneously, or the output corresponding to the ABS determination may be checked periodically (e.g., every few measurements, such as in accordance with a time multiplex of the fine and ABS measurements). An implementation which is configured in accordance with and to utilize a combination of the periodic and un-even sampling techniques is described in more detail below with respect to FIG. 11.

Figure 11:
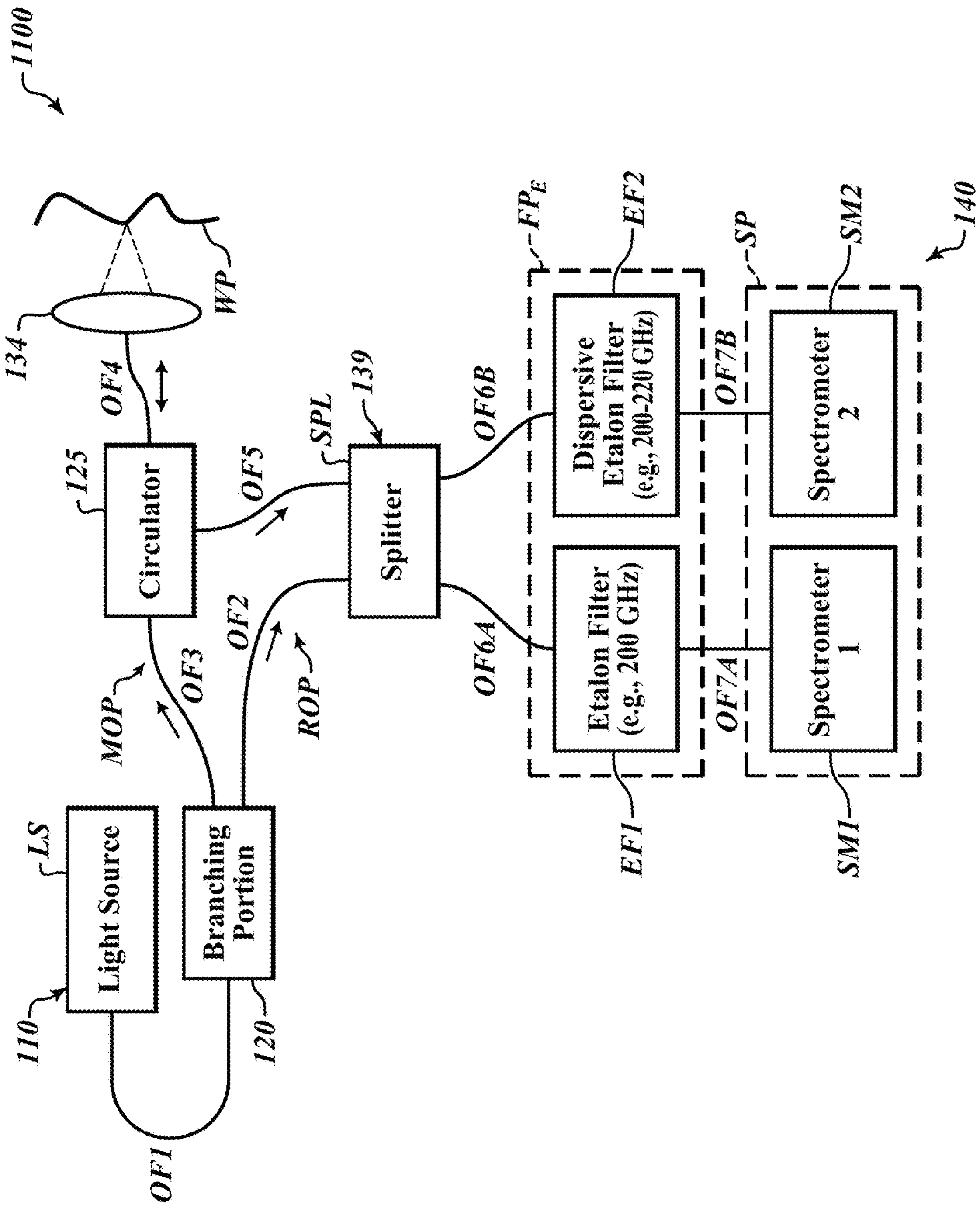
FIG. 11 is a block diagram illustrating a fifth implementation of a portion of a metrology system including a spectrometer portion.

FIG. 11 is a block diagram illustrating a fifth implementation of a portion 1100 of a metrology system. As shown in FIG. 11, the metrology system includes a light portion 110 (e.g., comprising a light source LS), a branching portion 120, a circulator portion 125, an optical head portion 134, a combining portion 139 (e.g., comprising an optical splitter SPL), an optical filter portion $FP_E$ and a spectrometer portion SP. In various implementations, the spectrometer portion SP and/or the optical filter portion $FP_E$ may be included in a detector portion 140 (e.g., as part of a detector and processing portion DPP of a circuitry portion 102, such as described above with respect to FIGS. 1, 3 and 4). In general, the operations and couplings of the portions 110, 120, 125, 134 and 139 may be similar or identical to those of FIG. 7, and may be understood in accordance with the above description of FIG. 7.

In the specific example of FIG. 11, the combining portion 139 provides outputs through optical fibers OF6A and OF6B (e.g., for which in various implementations the outputs may be functionally similar, and may each include combined light in accordance with the operations of the combining portion 139). The optical filter portion $FP_E$ includes an optical filter EF1 and an optical filter EF2. The optical fiber OF6A is coupled to the optical filter EF1 and the optical fiber OF6B is coupled to the optical filter EF2 (i.e., thus coupling each of the optical filters EF1 and EF2 to the respective outputs of the combining portion 139). In various implementations, the optical filters EF1 and EF2 may be etalon filters. In certain implementations, the optical filter EF1 may be a 200 GHz etalon filter, and the optical filter EF2 may be a 200-220 GHz dispersive etalon filter.

The optical filter portion $FP_E$ is coupled to the spectrometer portion SP by optical fibers OF7A and OF7B. The spectrometer portion SP includes a spectrometer SM1 and a spectrometer SM2. The optical filter EF1 is coupled to the spectrometer SM1 by the optical fiber OF7A. The optical filter EF2 is coupled to the spectrometer SM2 by the optical fiber OF7B.

In the illustrated configuration, the optical filter portion $FP_E$ is located along an optical path between the branching portion 120 and the spectrometer portion SP (e.g., and in this particular example is more specifically located along an optical path between the combining portion 139 and the spectrometer portion SP). In accordance with principles as described herein, each optical filter EF1 and EF2 of the optical filter portion $FP_E$ is configured to filter incoming light and produce light comprising a series of spectral peaks (e.g., as may be analogous to a series of spectral peaks as described above with respect to FIG. 5). The spectrometer portion SP of the detector portion 140 is configured to receive light comprising a series of spectral peaks as provided by the optical filter portion $FP_E$. More specifically, the first optical filter EF1 is coupled to the first spectrometer SM1 and is configured to provide first light comprising a series of spectral peaks to the first spectrometer SM1, and the second optical filter EF2 is coupled to the second spectrometer SM2 and is configured to provide second light comprising a series of spectral peaks to the second spectrometer SM2. As noted above, the first and second optical filters EF1 and EF2 have different frequency properties (e.g., 200 GHz and 200-220 GHz) such that the first light that is provided to the first spectrometer SM1 is different than the second light that is provided to the second spectrometer SM2.

Figure 12:
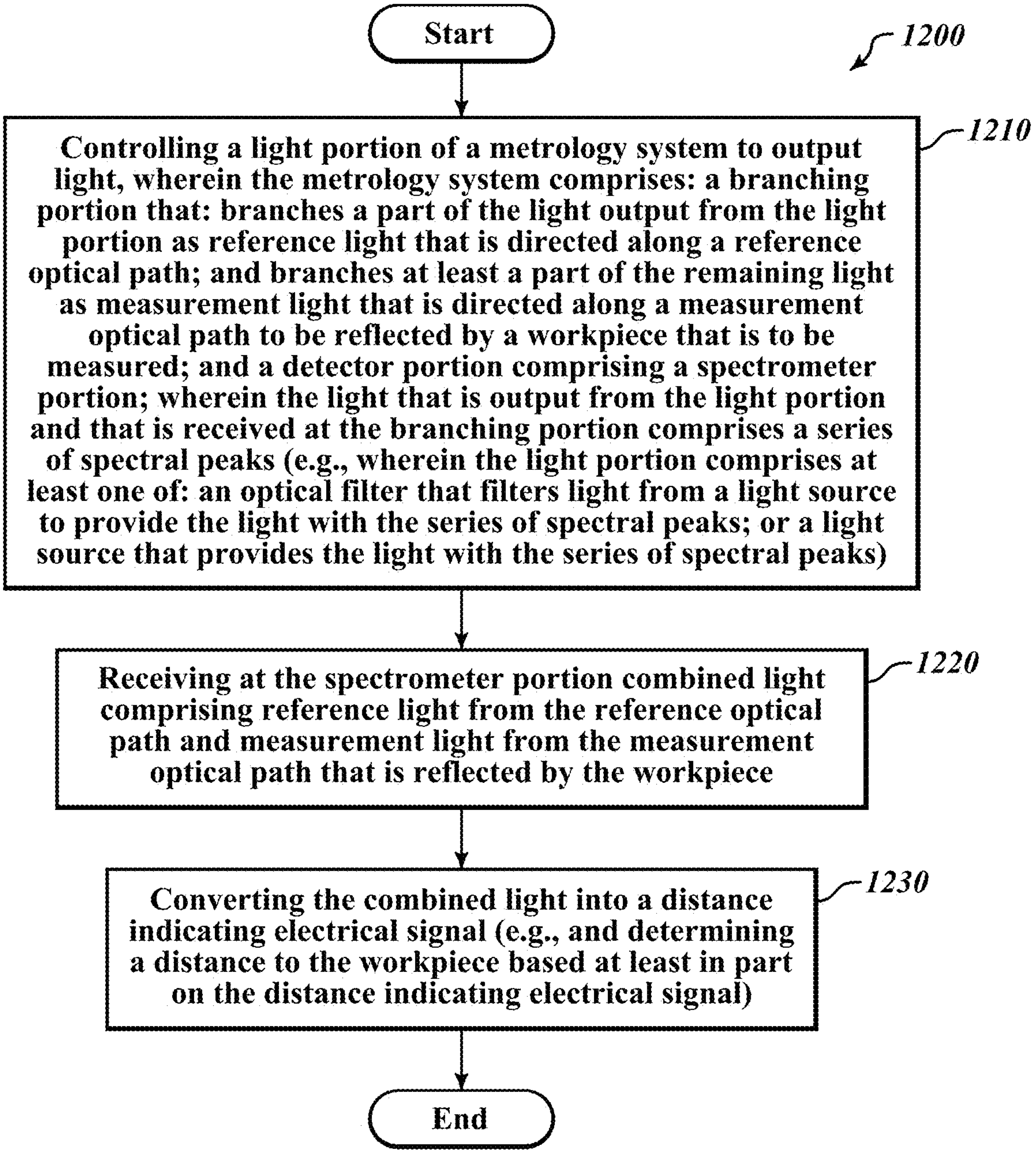
FIG. 12 is a flow diagram illustrating a first implementation of a routine for operating a metrology system.

FIG. 12 is a flow diagram illustrating a first implementation of a routine 1200 for operating a metrology system. At a block 1210, a light portion of a metrology system is controlled to output light, wherein the metrology system comprises a branching portion, and a detector portion that includes a spectrometer portion. The branching portion branches a part of the light output from the light portion as reference light that is directed along a reference optical path, and branches at least a part of the remaining light as measurement light that is directed along a measurement optical path to be reflected by a workpiece that is to be measured. The light that is output from the light portion and that is received at the branching portion comprises (e.g., consists of) a series of spectral peaks. In various implementations, the light portion comprises at least one of: an optical filter that filters light from a light source (e.g., of the light portion) to provide the light with the series of spectral peaks; or a light source that provides the light with the series of spectral peaks.

At a block 1220, combined light is received at the spectrometer portion, wherein the combined light comprises reference light from the reference optical path and measurement light from the measurement optical path that is reflected by the workpiece. At a block 1230, the combined light is converted into a distance indicating electrical signal. In various implementations, a distance to the workpiece may be determined based at least in part on the distance indicating electrical signal.

Figure 13:
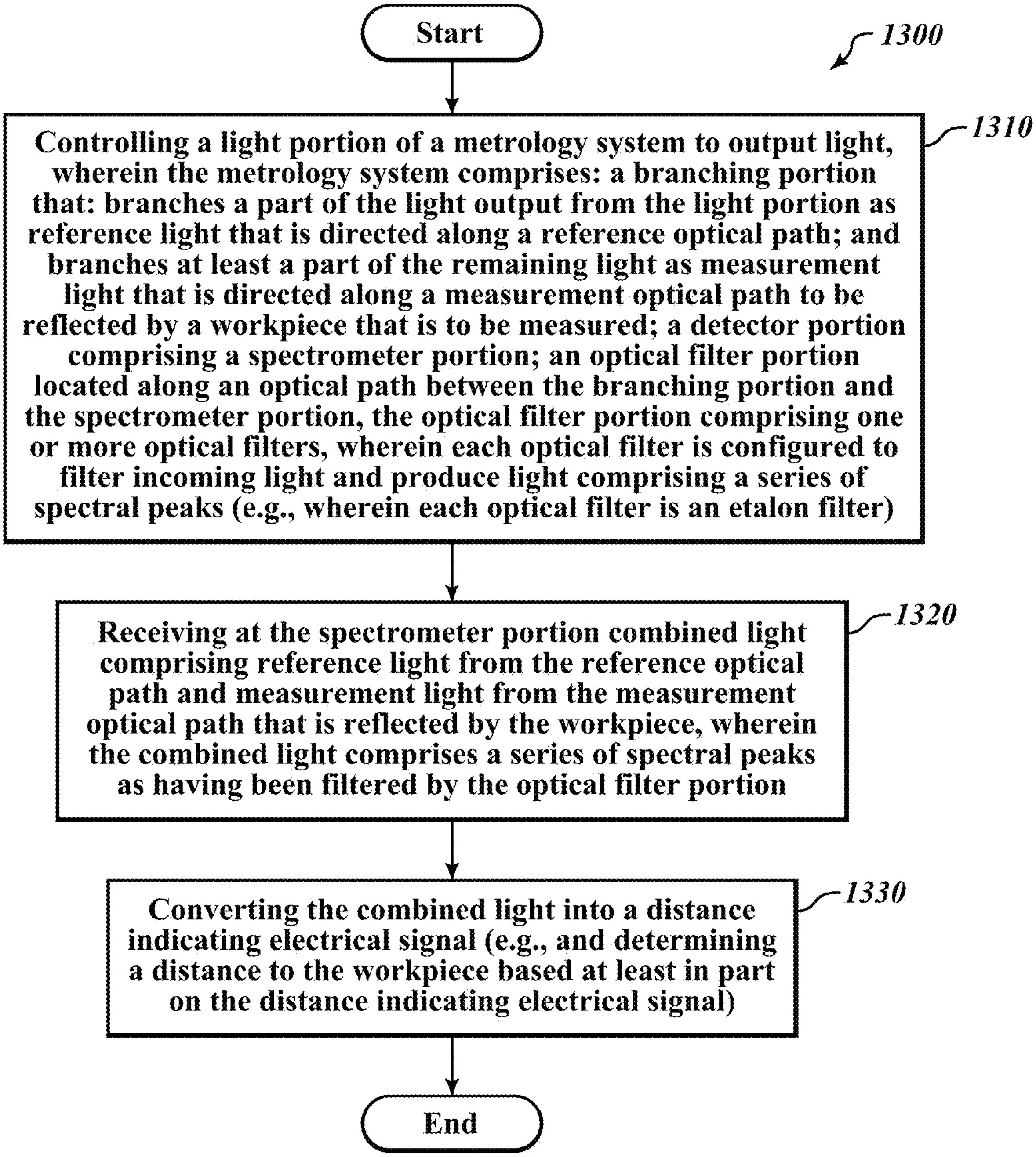
FIG. 13 is a flow diagram illustrating a second implementation of a routine for operating a metrology system.

FIG. 13 is a flow diagram illustrating a second implementation of a routine 1300 for operating a metrology system. At a block 1310, a light portion of a metrology system is controlled to output light, wherein the metrology system comprises a branching portion, a detector portion, and an optical filter portion. The branching portion branches a part of the light output from the light portion as reference light that is directed along a reference optical path, and branches at least a part of the remaining light as measurement light that is directed along a measurement optical path to be reflected by a workpiece that is to be measured. The detector portion comprises a spectrometer portion. The optical filter portion is located along an optical path between the branching portion and the spectrometer portion. The optical filter portion comprises one or more optical filters, wherein each optical filter is configured to filter incoming light and produce light comprising (e.g., consisting of) a series of spectral peaks. In various implementations, each optical filter may be an etalon filter.

At a block 1320, combined light is received at the spectrometer portion, wherein the combined light comprises reference light from the reference optical path and measurement light from the measurement optical path that is reflected by the workpiece. The combined light comprises (e.g., consists of) a series of spectral peaks as having been filtered by the optical filter portion. At a block 1330, the combined light is converted into a distance indicating electrical signal. In various implementations, a distance to the workpiece may be determined based at least in part on the distance indicating electrical signal.

As noted above, in various implementations certain SD-OCT systems have advantages compared to certain SS-OCT/FMCW systems (e.g., such as in regard to simplicity, larger bandwidths, lower cost, doppler insensitivity, etc.). In certain prior configurations, SD-OCT systems have in some implementations been limited to short range (e.g., a few mm) measurements (e.g., due to both the minimum frequency step size achieved in typical spectrometers and the coherence length of the broadband source, such as after spectral filtering). In accordance with principles as described herein, certain implementations (e.g., of FIG. 7-11) may help address such limitations (e.g., achieving a longer measurement range, etc.)

As described above, such implementations may include in some instances adding one or more optical filters (e.g., adding one or more etalon filters) in an optical path (e.g., after the branching portion but before the spectrometer portion), or including a light portion with an optical filter (e.g., an etalon filter) or a light source that otherwise produces a series of spectral peaks. Such techniques may reduce bandwidth (e.g., of the light) on each pixel (e.g., of the one or more spectrometers of the spectrometer portion), thus increasing the coherence length in each spectrometer of the spectrometer portion. In various implementations, such techniques may be characterized as addressing a general challenge for SD-OCT systems, which is contrast reduction when nearing the detectors Nyquist frequency (e.g., due to smearing of the interference signal, etc.). As described above, in various implementations a multi-measurement technique may be utilized to overcome a limited number of samples and/or a limited spectral resolution (e.g., of utilized grating spectrometers, etc.). In general, a large improvement in the usable ABS range may result from the utilization of techniques such as those described herein.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:

a light portion comprising a light source, wherein the light portion is configured to output light;

a branching portion comprising a splitter component, wherein the branching portion is configured to:

branch a part of the light output from the light portion as reference light that is directed along a reference optical path; and branch at least a part of the remaining light as measurement light that is directed along a measurement optical path to be reflected by a workpiece that is to be measured;

a detector and processing portion comprising:

a detector portion comprising a spectrometer portion which comprises a spectrometer; and a processing portion which comprises a processor, wherein the processing portion processes signals from the detector portion;

wherein the detector and processing portion is configured to:

receive combined light comprising reference light from the reference optical path and measurement light from the measurement optical path that is reflected by the workpiece; and convert the combined light into a distance indicating electrical signal; and an optical filter portion comprising one or more optical filters, wherein the optical filter portion is located along an optical path between the branching portion and the spectrometer portion, wherein each optical filter is configured to filter incoming light and produce light comprising a series of spectral peaks.

2. The metrology system of claim 1, wherein each optical filter is an etalon filter.

3. The metrology system of claim 1, wherein the spectrometer portion of the detector portion is configured to receive light comprising a series of spectral peaks as provided by the optical filter portion.

4. The metrology system of claim 3, wherein the spectrometer portion comprises first and second spectrometers, which are each configured to receive light comprising a series of spectral peaks as provided by the optical filter portion.

5. The metrology system of claim 4, wherein:

the optical filter portion comprises first and second optical filters;

the first optical filter is coupled to the first spectrometer and is configured to provide first light comprising a series of spectral peaks to the first spectrometer; and the second optical filter is coupled to the second spectrometer and is configured to provide second light comprising a series of spectral peaks to the second spectrometer.

6. The metrology system of claim 5, wherein the first and second optical filters have different frequency properties such that the first light that is provided to the first spectrometer is different than the second light that is provided to the second spectrometer.

7. The metrology system of claim 6, wherein the first and second optical filters are etalon filters.

8. The metrology system of claim 5, further comprising a combining portion which comprises a combiner, wherein the combining portion is configured to:

receive and combine reference light from the reference optical path and measurement light from the measurement optical path;

provide combined light to the first optical filter; and provide combined light to the second optical filter.

9. The metrology system of claim 1, wherein the detector and processing portion is further configured to determine a distance to the workpiece based at least in part on the distance indicating electrical signal.

10. The metrology system of claim 1, further comprising an optical head portion which comprises a lens, wherein the optical head portion, as a part of the measurement optical path, directs light through free space to the workpiece and receives measurement light that is reflected by the workpiece.

11. The metrology system of claim 10, wherein as part of the measurement optical path a measurement path optical fiber provides light to the optical head portion and receives the measurement light from the optical head portion.

12. The metrology system of claim 1, further comprising a combining portion that comprises a combiner, wherein the combining portion receives and combines reference light from the reference optical path and measurement light from the measurement optical path, wherein the optical filter portion receives combined light from the combining portion.

13. The metrology system of claim 12, wherein as part of the reference optical path, the reference light travels through a reference path optical fiber to the combining portion, and as part of the measurement optical path, the measurement light travels through a measurement path optical fiber to the combining portion.

14. A method for operating a metrology system, the metrology system comprising:

a light portion comprising a light source and that outputs light;

a branching portion comprising a splitter component and that:

branches a part of the light output from the light portion as reference light that is directed along a reference optical path; and branches at least a part of the remaining light as measurement light that is directed along a measurement optical path to be reflected by a workpiece that is to be measured;

a detector portion comprising a spectrometer portion which comprises a spectrometer; and an optical filter portion comprising one or more optical filters, wherein the optical filter portion is located along an optical path between the branching portion and the spectrometer portion, wherein each optical filter is configured to filter incoming light and produce light comprising a series of spectral peaks;

the method comprising:

controlling the light portion to output light;

receiving at the spectrometer portion combined light comprising reference light from the reference optical path and measurement light from the measurement optical path that is reflected by the workpiece, wherein the combined light comprises a series of spectral peaks as having been filtered by the optical filter portion; and converting the combined light into a distance indicating electrical signal.

15. The method of claim 14, further comprising determining a distance to the workpiece based at least in part on the distance indicating electrical signal.

16. The method of claim 14, wherein each optical filter is an etalon filter.

17. The method of claim 14, wherein the spectrometer portion of the detector portion receives light comprising a series of spectral peaks as provided by the optical filter portion.

18. The method of claim 17, wherein the spectrometer portion comprises first and second spectrometers, which each receive light comprising a series of spectral peaks as provided by the optical filter portion.

19. A metrology system, comprising:

a light portion comprising a light source, wherein the light portion is configured to output light;

a branching portion comprising a splitter component, wherein the branching portion is configured to:

branch a part of the light output from the light portion as reference light that is directed along a reference optical path; and branch at least a part of the remaining light as measurement light that is directed along a measurement optical path to be reflected by a workpiece that is to be measured;

a detector portion comprising a spectrometer portion which comprises a spectrometer; and an optical filter portion comprising one or more optical filters, wherein the optical filter portion is located along an optical path between the branching portion and the spectrometer portion, wherein each optical filter is configured to filter incoming light and produce light comprising a series of spectral peaks;

wherein the metrology system is configured to:

control the light portion to output light;

receive at the spectrometer portion combined light comprising reference light from the reference optical path and measurement light from the measurement optical path that is reflected by the workpiece, wherein the combined light comprises a series of spectral peaks as having been filtered by the optical filter portion; and convert the combined light into a distance indicating electrical signal.

20. The metrology system of claim 19, wherein each optical filter is an etalon filter.

* * * * *